United States Patent
Hamby et al.

[11] Patent Number: 5,388,455
[45] Date of Patent: Feb. 14, 1995

[54] ELECTROMAGNETIC BOREHOLE FLOWMETER SYSTEM

[75] Inventors: Jimmie W. Hamby; Hubert S. Pearson, both of Knoxville; William R. Waldrop; Donald E. Warren, both of Powell; Steven C. Young, Oak Ridge, all of Tenn.

[73] Assignee: Tennessee Valley Authority, Muscle Shoals, Ala.

[21] Appl. No.: 151,671

[22] Filed: Nov. 15, 1993

Related U.S. Application Data

[62] Division of Ser. No. 857,555, Mar. 23, 1992, Pat. No. 5,297,425.

[51] Int. Cl.$^6$ ............................................... G01F 1/00
[52] U.S. Cl. ........................................ 73/151; 73/151.5
[58] Field of Search ............. 73/151.5, 861.17, 861.16, 73/151; 340/853.1, 854.2, 855.8, 855.9

[56] References Cited

U.S. PATENT DOCUMENTS

| | | | |
|---|---|---|---|
| Re. 28,989 | 10/1976 | Cushing | 73/861.17 |
| 3,518,623 | 6/1970 | Langford | 340/855.9 |
| 4,566,317 | 1/1986 | Shakra | 73/155 |
| 4,754,642 | 7/1988 | Miyairi et al. | 73/155 |
| 4,827,765 | 5/1989 | Kessler | 73/155 |

*Primary Examiner*—Richard E. Chilcot, Jr.
*Assistant Examiner*—R. Biegel
*Attorney, Agent, or Firm*—Robert A. Petrusek

[57] ABSTRACT

An improved flowmeter system is described, together with circuitry, hardware, and techniques for its utilization for determining the rate of flow of fluids in conduits at a situs substantially remote from the information gathering and analysis situs. Arrangements are provided for utilization of the system in conduits, including deep water wells, having diameters as small as 2 inches, and wherein very low flowrates of liquid therein can be quite accurately measured to depths in the range of hundreds to thousands of feet. The device is configured sans moving parts, which overcomes prior art arrangements heretofore prone to wear and drift from calibration, and utilizes a new unique arrangement of transducer drive signals and sampling signals operatively associated with a plurality of timing networks whereby the precision and accuracy of the resulting system is not only enhanced by sampling well after the switching transients therein have decayed, but is even further substantially improved by compensating for the random drift, albeit relatively small, of the transducer output signals caused thereby through the deselection of the otherwise metered signal just prior to and post a polarity change in the AC-square wave excitation to said transducer, such that the resulting clamped switching transients are effectively prevented from causing noise feedback to the portion of the metering signal received and utilized as determinative of flowrate events at said remotely located situs.

8 Claims, 10 Drawing Sheets

A

B

ELECTROMAGNETIC BOREHOLE FLOWMETER SYSTEM

This is a division of application Ser. No. 857,555, filed Mar. 23, 1992, now U.S. Pat. No. 5,297,525.

The Invention herein described may be manufactured and used by or for the government for governmental purposes without the payment to us of any royalty therefor.

INTRODUCTION

One of the major benefits of the movable submersible in-line electromagnetic borehole flowmeter system described herein is that it provides geohydrologists and engineers with a new and extremely sensitive tool for measuring vertical variations of horizontal inflow to a groundwater well. These measurements provide geohydrologists and engineers with the information necessary to calculate the vertical variations of hydraulic conductivity in porous media. Hydraulic conductivity is a geologic property that characterizes the capability of a porous media (e.g., soil) to transmit water. An accurate determination of the hydraulic conductivity in three-dimensions at a geologic site is vital to many aspects of groundwater protection, pollution abatement, and resource development.

Currently, the most common method used by geohydrologists to measure hydraulic conductivity is the so called pump test. A pump test involves pumping water from a well and measuring the water level response in the well over a period of time. By using established geohydrologic principles, the resulting water-level response is used to calculate the average hydraulic conductivity throughout the vertical column through which water flows into the well. Accordingly, such a state of the art pump test provides no information concerning specific vertical locations of high water-bearing zones in the media through which water and hence contaminants are likely to be transmitted, i.e., it cannot provide a profile, in the vertical dimension, of the soil water percolation characteristics.

From about 1983 until the present time, the Tennessee Valley Authority (TVA) has conducted a variety of research program activities relating to methods for characterizing aquifer properties. The program included the use and evaluation of a borehole flowmeter of the impeller type. The impeller flowmeter can be used to measure vertical flow at specific depths in a well which is being pumped at a constant and known rate. By systematically positioning the flow probe at intervals in the well, the amount of water entering the screened well at each interval can be measured. The resulting data can be related to spatial variability of hydraulic conductivity in an aquifer by assuming the flow of groundwater therein is horizontal and unbounded. Accordingly, with such data in hand, the hydraulic conductivity in each layer in the aquifer may be calculated by utilizing the technique set forth by Cooper, H. H., and C. E. Jacob, "A Generalized Graphical Method for Evaluating Formation Constants and Summarizing Well-Field History," *Trans. Amer. Geophy. Union*, 217, pp 526–534 (1946). For purposes of teaching, disclosing, and claiming the instant invention, the teachings and disclosures of Cooper, et al., just supra, are herewith and hereby incorporated herein by means of reference thereto.

Preliminary results from the ongoing research program, supra, indicated that the borehole flowmeter technique has much promise for providing economical evaluations of vertical variations of hydraulic conductivity; however, as those skilled in this art readily appreciate, any flowmeter which relies upon mechanical parts such as an impeller for measuring flow is limited and fraught with numerous shortcomings, not the least of which is the likelihood of experiencing reliability and resolution problems under normal operating conditions. For example, the impeller flowmeter is simply not a very useful tool when it is required for use in measuring velocities less than about 0.1 foot per second, and is characterized as having relatively poor precision at flow rates slightly thereabove. Furthermore, it was found that the calibration curve for the impeller type flowmeter frequently shifted as a result of corrosion and wear on the bearings during such testing. Such problems are typical of flowmeters with mechanical components exposed to harsh field conditions. Because precision and accuracy are important at all flow rates, development was undertaken of a sensitive, but field-worthy, borehole flowmeter constructed in a manner so as to have no moving mechanical components. As a result of this later work, new methods and means have now been discovered for significantly extending the range of applicability of the borehole method for accurately defining subsurface characteristics in zones having very low hydraulic conductivities and in sites which may be contaminated with toxic waste, wherefrom very low extraction rates are most important considerations.

FIELD OF THE INVENTION

The instant invention was made and tested in the conduct of geohydrological research and instrumentation development. The present invention incorporates new and innovative advancements in the application of electromagnetics, analog sampling, and mechanical design to measure vertical flow rates in groundwater wells over a significantly wider range and with more accuracy and reliability than has been previously possible, thereby resulting in an invention which has broad applicability for geohydrologic analyses. Furthermore, it is likely that the instant new invention can be utilized in other situations in which it is desirable to measure flow rates of conducting fluids from the interior of pipes of two inches or greater, particularly when access to the exterior of the pipe is impeded. For example, the instant invention could be useful in locating precise positions of pipe ruptures by measuring where longitudinal flow rates change abruptly.

It is also expected that further miniaturization of a particular component of the instant invention, to wit, the new probe, could offer substantial technological and economic advantages in countless other applications in a plethora of other technical disciplines. This present configuration of flowmeter probes is the result of an extensive design, development and testing program. The first flow probe was a potted assembly approximately one inch in diameter that was inserted in the well with the water flowing around the flow probe. The electrodes were mounted flush with the outside of the probe and sealed with epoxy. The output signal generated by this probe was very small and noise was a significant problem. Increasing the drive voltage to the electromagnet to increase the magnetic field provided a larger signal, but to obtain a marginally acceptable signal to noise ratio, the magnet drive had to be increased to a level that resulted in severe heating and damage to the electromagnet when the flow probe was out of the water.

The second flow probe design was similar to the present instant invention in that the water flow was through the center of the probe. The probe was constructed on a PVC pipe core and then potted in a water proof epoxy using a split mold to do the potting. Initial tests of the flow probe were successful; the flow through design of the probe gave higher magnetic flux densities at lower magnet drive levels, which improved the signal to noise ratio by yielding a larger output signal. Several problems still remained in that the epoxy was subject to abrasion and chipping leading to water leaks, and while in some field locations the flow probe worked very well, at others the output signal would drift slowly for no apparent reason. Further testing revealed the signal drift was caused by large potential differences due to ground currents that were present in some locations. By enclosing the probe in a stainless steel housing and electrically connecting the power supply common to the stainless steel housing, both the durability problem and the signal drift problems were solved.

The advancements made in the design of the electronics of the present invention will contribute substantially to the advancement of state of the art related to measuring flows of conducting fluids. The present invention contains integrated electronics in a flow probe of the electromagnetic type. This innovation permits the operation of the instant new electromagnetic borehole flowmeter (EBF) system at the end of long cables (i.e., up to at least several thousand feet). The extreme sensitivity of the instant invention is attributable to a new and novel use of the integrated electronics in the flow probe together with a pi configured Complementary Metal Oxide Semiconductor (CMOS) analog switch which minimizes many of the problems heretofore associated with using AC square wave excitation.

DESCRIPTION OF THE PRIOR ART

During the past several years, it has been customary for petroleum engineers to use flowmeters to record vertical flow at various depths along boreholes. The particular flowmeters contained impellers to measure flow rates in fluids of relatively high viscosities and in fluids being moved at substantial velocities; consequently, these instruments could not be utilized to provide the sensitivity required for groundwater analyses. Furthermore, the physical size (four inches or greater in diameter) of these prior art instruments rendered same poorly suited for 2-inch I.D. wells, commonly used in geohydrological investigations. In a closely related research, conducted by TVA, a 2-inch O.D. impeller flowmeter was built and evaluated for use in geohydrologic applications. This research proved the concept viable, but the specially-built impeller flowmeter did not have the requisite accuracy and sensitivity for many types of geological applications.

Also, within the past decade, geohydrologists have used an instrument sensitive to thermal fluxes for measuring much lower flows than those possible with impeller based devices of the type discussed supra. This instrument introduces a pulse of heat in the water, then detects the heat pulse at a known distance from the heat source. The usual implementation of a flowmeter using the heat-pulse method presents several problems. A heater, which is typically a grid placed in the flow path and excited by a pulse of electrical current, is required to introduce the heat pulse into the water. To detect the heat pulse, a temperature sensor is placed in the flow path, downstream, and at a known distance from the heat source. The travel time of the pulse of heat from the source to the temperature sensor is then measured and is inversely proportional to the flow rate of the water. Problems arise when debris in the water collects on the grid used to generate the heat pulse, thus causing a restriction, and altering the flow rate being measured. Also, the temperature sensors used to detect the heat pulse must have a low thermal mass to enable the sensor to respond quickly to the arrival of the heat pulse. To have a low thermal mass, the sensor must be small, and therefore, vulnerable to damage. This device has been found to provide adequate sensitivity for relatively low flows, but unfortunately is incapable of accurately recording higher flow rates due to the short travel time of the heat pulse. Consequently, neither type of instrument, e.g., the impeller type, or the thermal flux type is capable of recording flows throughout a range desirable for most geohydrologic applications. Furthermore, both types of such prior art instruments have been found to be susceptible to calibration drift during field applications.

The device comprising the instant invention as herein described, provides not only the accuracy and precision throughout the range of flows required, but also the ruggedness required of a field instrument. Indeed, there appears to be no other device which offers all of the following attributes desirable for geohydrologic applications:

1) Use in cased or uncased wells ranging in diameter between two and ten inches (as currently configured);
2) Provides accurate and repeatable measurements in fluid having velocities of between about 0.001 and about 5 feet per second;
3) Contains no moving parts which may degrade from wear during use;
4) Contains no adjustable parts that may affect calibration;
5) Is not susceptible to the corrosive action of groundwater including that presented by a variety of contaminates therein; and
6) Calibration is not dependent on the chemical or physical properties of the fluid so long as the fluid has an electrical conductance above a threshold level.

In the instance of considering attribute (6), supra, factors such as viscosity and density of the liquid being metered have no effect on the measurement accuracy of the meter and, therefore, signal compensation is not required. Thus, in applications of very deep wells, where the water temperature and the density may vary, with distance from the surface, this type of meter is of the greatest desirability. Tests indicated that for the device of the instant invention, the minimum allowable or threshold fluid conductivity is about 3 $\mu$S/cm. For convenience, the conductivity of the liquid, including groundwater (in microsiemens/cm), may be determined from the AC electrode resistance measurement (in megohms) by calculating the reciprocal of the product resulting from multiplying the AC resistance (in megohms) by the flow probe electrode diameter (in centimeters).

SUMMARY OF THE INVENTION

The present invention provides vastly improved capabilities for measuring flow rates at various positions inside a conduit. The unique features of this invention are that the flow probe can fit into as small as a two-inch diameter pipe; can be used with an inflatable packer assembly which allows application in conduit, including groundwater wells, cased or uncased, of up to about ten inches in diameter; can accurately measure fluid velocities in the range of between about 0.001 and about 5 feet per second; can operate with connector (support) cable lengths upward of several thousand feet.

The means of the present invention is comprised of three primary components: the flow probe, the packer assembly, and the electronics package. The first two components, to wit, the flow probe and, if necessary because of large conduit diameters, the packer assembly are inserted in the conduit including down a well; the third component, the electronics package, remains separate therefrom and in the instance of a well, above ground. The flow probe includes an electromagnet, two electrodes, and integrated electronics, all of which are set into a high-strength water-tight epoxy matrix which, in turn, is encased within a stainless steel housing. While in the conduit or down a well, the probe receives power and transmits electrical signals to and from the electronics package above ground through a multiconductor, watertight cable. This cable also supports the probe in applications wherein same is hung thereby. The electronics package, which is housed in a waterproof and dust proof vessel, can operate from either batteries or AC power.

One important function of the electronics package in a principal embodiment of the instant invention is to provide an adjustable drive voltage to the electromagnets in the probe. A principal requirement that the drive voltage be adjustable is to maximize the signal-to-noise ratio from the flow probe when the length of the multiconductor cable is changed. A long cable necessary to measure flow in a deep well requires a higher magnet drive voltage due to the added electrical resistance of the cable. The adjustable magnet drive voltage is produced by switching a DC voltage with a complementary bridge circuit to provide a square wave AC signal to the electromagnets. The resulting AC field minimizes the polarization of the electrodes in the probe and permits filtering of any voltage drift. The voltage measured by the electrodes is routed first through an AC amplifier to increase the amplitude and drive capability, and then through a cable to the electronics package.

In the electronics package, the flow signal is passed through a pi configured CMOS analog switch to remove switching transients occurring when the polarity of the electromagnet drive voltage is reversed, and to remove any DC offset in the signal. Sampling and filtering of the flow signal is accomplished by a synchronous sampling circuit and integrator to provide a DC signal proportional to the rate of fluid flow through the channel of the flow probe. The DC output signal generated by the electronics package covers the range of plus or minus five volts. This voltage output range can be set by a switch to correspond to either of two ranges of flow: either between 0 to about 5 feet per second, or between 0 to about 1 foot per second to provide better resolution at lower flows.

The timing for the electronics system is provided by a master oscillator divided down to provide the various signals required. The oscillator can be synchronized to line frequency when AC power is available, or it can be operated unsynchronized, at or near line frequency. The timing signals are generated with CMOS logic to minimize power consumption. With the master oscillator operating at or near line frequency, proper synchronization exists to create a noise immunity of 60 Hz. Other potential interferences are minimized by using separate isolated power supplies for the magnet drive and for the measuring circuits.

The packer assembly consists primarily of a ¼-inch thick, 8-inch long rubber cylinder which is tightly bonded at the ends to the periphery of a 2-inch ID metal pipe which pipe fits snugly around the flow probe. When the packer assembly is fitted to the outside of the probe, screws and O-rings are used to create a water tight seal at the top and bottom of the packer assembly and the probe. The packer assembly can then be inflated or deflated through a small diameter metal tube, usually about ¼ inch in diameter. One end of this tube is exposed at the top of the probe, whereas the other end is flush with the outside of the probe about midway between the ends where the rubber gaskets are attached. The packer can thus be inflated, and subsequently deflated, by pumping water from ground level through a plastic tube which runs parallel to and juxtaposed the multiconductor cable, through the metal tube in the probe, and into the region between the rubber gasket of the packer assembly and the outer wall of the probe. The packer can be inflated until the desired pressure is reached to create an effective seal between the outer wall of the probe and the side wall of the well. In such an arrangement, all vertical flow in the well is directed through the hollow core of the probe for measurement and determination of liquid flow rate. The inflation and deflation of the packer can be controlled by a pump located at ground level or it may be located below ground level and separate from the electronics package controlling the data acquisition of the EBF system.

The inside diameter of the instant assembly is about 2 inches to thereby permit fitting of same over the outside of the probe. The outside diameter of the packer assembly, in the deflated mode, measures about 3.5 inches. Thus, in wells having diameters in the range of between about 2 inches and about 3.5 inches, the instant packer assembly can not be used. Fortunately, most wells that are drilled do not fall within this size range. However, in such instances wherein the borehole diameter ranges between about 2 to about 3.5 inches, it has now been found that a Plexiglass collar can be custom fitted around the probe. NOTE: Any references made herein to materials, apparatuses, or sources thereof which are identified by means of trademarks, trade names, etc., are included solely for the convenience of the reader and are not intended as, or to be construed, an endorsement of such materials, apparatuses, and/or sources.

OBJECTS OF THE INVENTION

It is therefore the principal object of the present invention to provide new methods and means for accurately and precisely measuring fluid velocities ranging between about 0.001 and about 5.0 feet per second in conduits having a diameter ranging downwards to as little as about 2 inches.

A further object of the instant invention is to provide new methods and means for measuring vertical fluid flow in uncased boreholes which may have diameters that vary over the vertical length of the borehole and can be accomplished with a new, reliable, simple, and effective inflatable packer assembly that can expand from a diameter of about 3.5 inches to a diameter of about 10 inches.

Another object of the instant invention is to provide a new method along with means for accomplishing same wherein square wave excitation techniques of the prior art are highly improved to thereby substantially increase the resolution of such techniques.

Still another object of the instant invention is to provide a new method along with means for accomplishing same wherein square wave excitation techniques of the prior art are highly improved to thereby increase the resolution of such techniques by at least one log, and wherein same is realized through the unexpected discovery that although the sampling of the signal can be delayed until the spikes or transients generated by the polarity reversal of the excitation signal to the electromagnet, and detected by electrodes coupled therewith, have decayed, said transients still act to feedback to the system noise and resolution degradation and must be removed from such sampling signal, albeit, they have decayed before the period of sampling has occurred.

Still further and more general objects and advantages of the present invention will appear from the more detailed description set forth in the following descriptions and examples, it being understood, however, that this more detailed description is given by way of illustration and explanation only and not necessarily by way of limitation, since various changes therein may be made by those skilled in the art without departing from the true scope and spirit of the instant invention.

BRIEF DESCRIPTION OF THE DRAWINGS

The present invention will be better understood from a consideration of the following description taken in connection with the accompanying drawings in which.

DETAILED DESCRIPTION OF THE DRAWINGS

Figure 1:
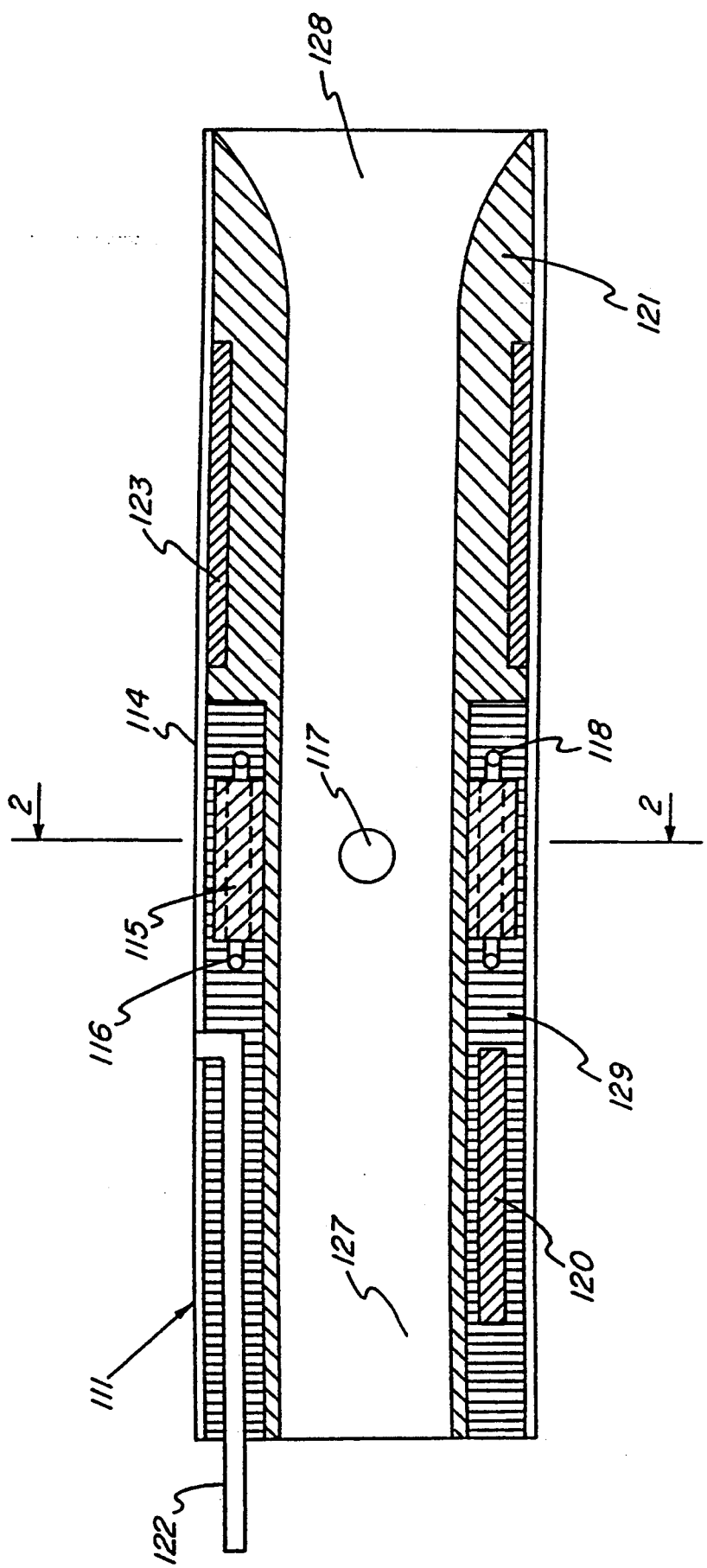
FIG. 1 shows a side elevational view of the instant, new, generally cylindrical flow probe, wherein said probe is shown in section.

For the sake of clarity, and a better understanding of the applicability of the illustrations and various drawings, a more detailed description of the same is given below. Note particularly, that in several of the following drawings the various apparatuses are shown or depicted in both planer view and in companion side elevational view, usually in cross section. Accordingly, in instances wherein possible, the numbering utilized therein is of the same sequence for equivalent subassemblies with the first of three digits relating to the drawing number. For example, one of the electrodes is generally shown and identified as 117 in FIG. 1, and as 217 in FIG. 2. Also note that in some of the descriptions which follow, it may be convenient to simultaneously refer to the same subassembly by both reference numbers. Accordingly, if it is desired to simultaneously refer to both 117 and 217 at the same time, the reference thereto would be 117/217.

A principal objective and purpose of the present invention is the creation of a borehole flowmeter eminently useful for providing in situ measurements of fluid flow rates in conduits ranging in diameter from between about 2 inches and about 10 inches; said conduits oftentimes comprising boreholes and the like. The resulting instant new flowmeter has a low detection threshold, good precision, and has no moving parts which can suffer from everyday wear-and-tear when used under extremely harsh conditions.

Figure 2:
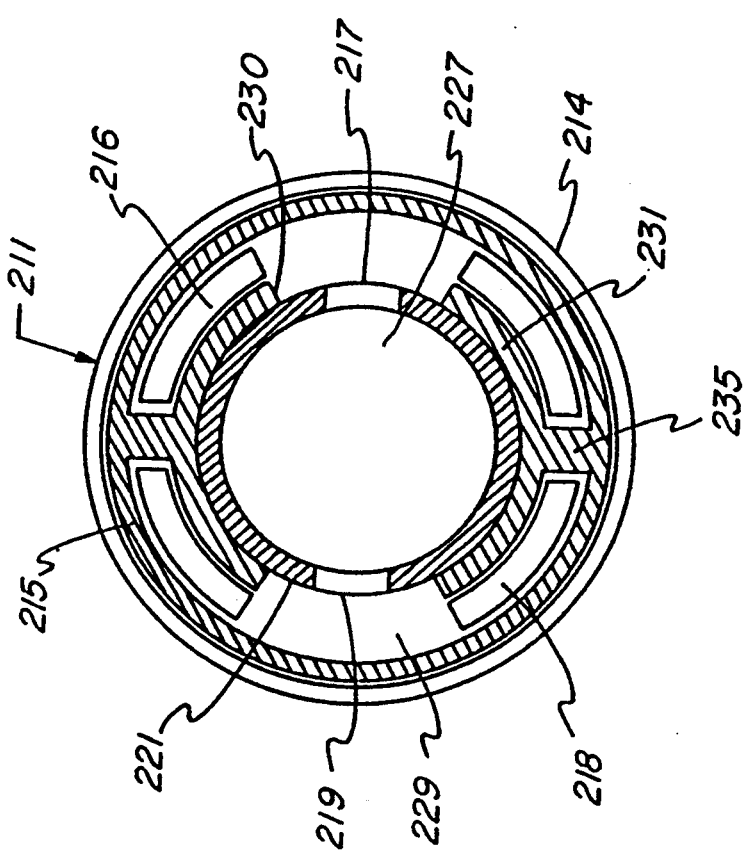
FIG. 2 is a cross sectional end view of the flow probe taken along line 2—2 of FIG. 1 and particularly illustrates the spatial relationship of the electrodes and electromagnetic core located within the flow channel.

Referring now more specifically to FIGS. 1 and 2, therein is shown both a side elevational view in section in FIG. 1 and in FIG. 2 a cross sectional end view thereof, taken along line 2—2 of FIG. 1.

Probe housing 114/214 may be conveniently constructed from 2 inch, 18 gage, type 304 stainless steel tubing. Housing 114/214 serves the dual purpose of providing mechanical strength and electrical shielding from background ground currents in the field environment. The major components of probe 111/211 are the electromagnet assembly, with the core generally shown at 115/215, and the coils of wire generally shown at 116/216 and 118/218, electrodes, generally shown at 117/217 and 219, amplifier assembly 120, spool 121/221, lead weight 123, and connector/pigtail cable, not shown. Electrodes 117/217 and 219 act as the transducer for deriving a signal relative to the rate or velocity of fluid flow thereover and output as such signal an AC voltage. Amplifier assembly 120 comprises an AC amplifier to increase the amplitude and drive capability of such AC signal before it is transmitted to the connecting cable, not shown.

Spool 121/221 may be constructed of PVC rod and machined to define and provide on the inside thereof flow channel 127/227, the throat of which is generally illustrated at 128. Spool 121/221 also provides the necessary support for other components. Electrodes 217 and 219 are preferably constructed of sintered silver-silver chloride to provide a stable electrode potential and reduce system noise and are mounted in the wall of spool 121/221 in such a way as to be flush with the inside surface of flow channel 127/227. In order to assure that the probe has sufficient weight to slide down a tight fit such as a 2 inch Schedule 40 cased borehole, lead weight 123 is added to spool 121/221 between electromagnet assembly 115/215 and throat portion 128 of flow channel 127/227. To provide mechanical strength and prevent water infiltration substantially all of probe assembly 111/211 is potted with a high dielectric strength waterproof epoxy shown generally at 129/229. Packer fill line 122 is an integral part of flowmeter probe 111/211, providing a means for filling with water and thereby inflating the packer assembly, not shown. It will be appreciated that in the embodiment herein shown, the flux path established between the field concentrators 230 and 231 of electromagnet assembly generally shown at 115 and across the pair of electrodes, one of which is generally illustrated at 117 in FIG. 1, supra, may be substantially shorter or longer than in the arrangement shown. An embodiment with a shorter flux path has several advantages in that the resulting closer coupling allows for a higher degree of precision and accuracy in signals induced between the electrodes, not shown, which are located within the throat of core 127/227. In addition to such closer coupling, it will also be appreciated that the longer the length of inner shaft 235 for spacing field concentrator 231 away from the ring portion of electromagnet assembly 215, the greater can be the number of conductor turns wound therearound. Accordingly, it has been found that it is desirable to utilize a probe of the instant invention type having the smaller flow channel when it can be reasonably anticipated that the inflow to the well to be tested is relatively low, whereas in situations of high groundwater percolation soil characteristics and attendant resulting high inflow rates to the test well, the larger flow channel arrangement is more preferred.

Figure 3:
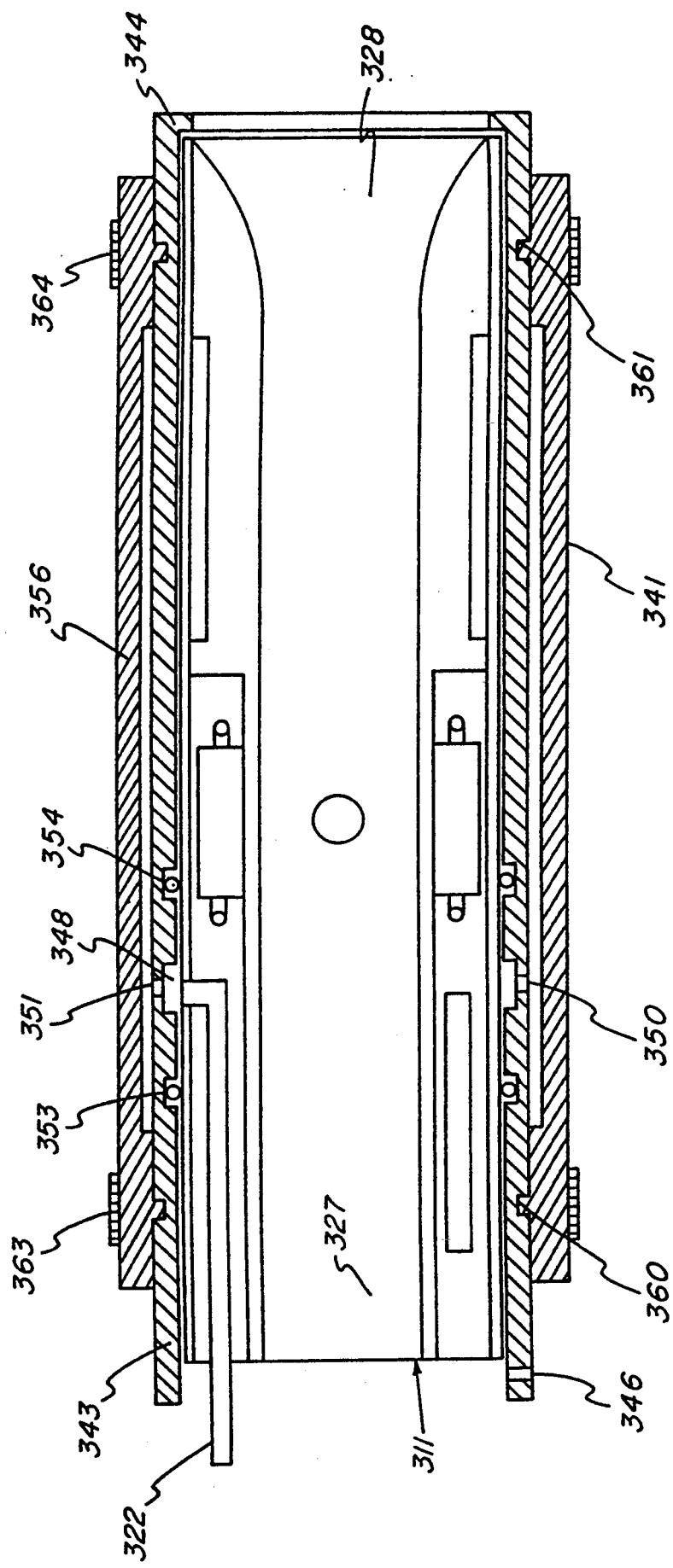
FIG. 3 shows a detailed cross sectional view in the same orientation as in FIG. 1, supra, showing the instant packer assembly, which assembly complements and is operatively associated with the instant probe, wherein the diameter of the well into which said probe is lowered is greater than about 3.5 inches.

Referring now more specifically to FIG. 3, therein is shown in section, the composite resulting when flowmeter probe 311 is fitted with packer assembly 341. Packer assembly 341 fits around flowmeter probe 311 to confine all vertical flow through flow channel 327 of flowmeter probe 311. A piece of aluminum tubing 343 with an inside diameter of 1.9 inches and a wall thickness of approximately 0.250 inches, is bored to an inside diameter of 2.03 inches to provide 0.03 inches clearance for flowmeter probe 311 to be inserted in packer assembly 341. When aluminum tubing 343 is bored, shoulder 344 of approximately 0.128 inches is left at one end to act as a stop for flowmeter probe 311. Retainer screw generally shown at 346 through the side of tube 343 at the other end is used to hold flowmeter probe 311 in packer assembly 341. Channel 348, 0.125 inches deep by 0.375 inches wide is machined in the inside wall of aluminum tube 343 at a location to line up with filler tube 322 in flowmeter probe 311. Two of four 0.250 inch ports generally illustrated at 350 and 351 are drilled from channel 348 through the wall of aluminum tube 343 to provide a flow path into the rubber cylinder 356. Ports 350 and 351 and the two not shown are positioned 90 degrees apart around aluminum tube 343. Internal grooves are machined on each side of flow channel 348 and fitted with "O"-ring seals 353 and 354 to seal packer assembly 341 to flowmeter probe 311 to prevent leakage of the fluid used to inflate rubber cylinder 356. Rubber cylinder 356 seals to aluminum tubing 343, and can be inflated to fill a cased or uncased well with a diameter ranging between 3.5 to 10 inches.

Internal projections 360 and 361 on each end of rubber cylinder 356 lock into mating grooves which are machined into the outside surface of aluminum cylinder 343. Rubber cylinder 356 is then clamped at each end with stainless steel clamps 363 and 364 to provide a fluid tight seal between rubber cylinder 356 and aluminum tube 343.

Figure 4:
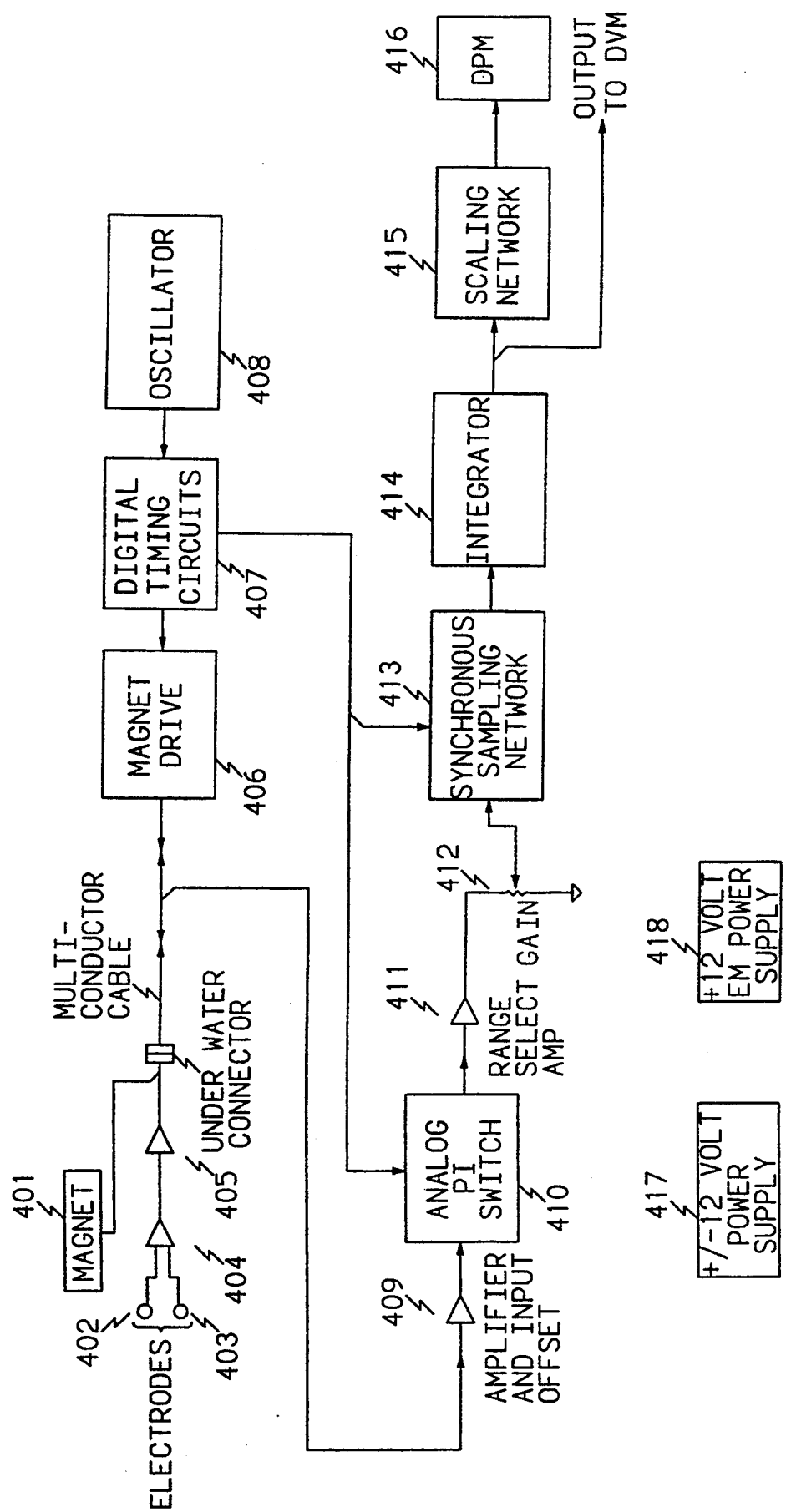
FIG. 4 illustrates, by means of a block diagram, a generalized circuit configuration of a principal embodiment of the instant borehole flowmeter system.

Referring now more specifically to FIG. 4 therein is illustrated by means of a block diagram a workable electrical circuit that has been used in the instant invention. The magnetic field used in a flowmeter can be either constant or alternating, generating a DC or AC output signal, respectively. Each type has unique problems. With a DC field, the voltage across the metal to liquid interface of the electrode and water is in series with the flow signal. The random drift of this signal is about the same size, and indistinguishable from the flow signal. The electrodes also tend to polarize, causing flow measurement errors.

An AC field greatly reduces the polarization of the electrodes, and allows the use of filtering to eliminate the voltage drift common to DC fields. The major disadvantage is that the AC field coils induce AC signals into the measuring circuit.

The supply voltage waveform for the electromagnet 401 used to generate the magnetic field in the flowmeter probe is a square wave. With square wave excitation, a large spike is induced, due to collapse/build, into the measuring circuit each time the square wave switches. As will be seen later, this problem is handled in the signal conditioning electronics by a unique sampling technique.

The flowmeter probe contains an electromagnet 401 to generate a magnetic field not shown, two electrodes 402 and 403, located 180 degrees apart, perpendicular to the direction of water flow and the magnetic flux lines, an instrumentation amplifier 404 with differential inputs and a buffer amplifier 405.

The instrumentation amplifier 404 has extremely high input impedance and low input bias currents. Locating an instrumentation amplifier and a buffer amplifier in the flowmeter probe provides several advantages:

1) High input impedance and low bias current requirements provide impedance matching and prevent loading of the signal from the electrodes.
2) The high source impedance of the electrode and water interface is converted to a low impedance output signal which allows a long cable to be used between the flowmeter probe and electronics package. Without the amplifiers the distance between the flowmeter probe and electronics package would be limited because of interfering signals picked up by the cable acting as an antenna, and the capacitance of the cable.
3) Differential inputs and a voltage gain of ten allow the microvolt signal from the electrodes to be measured in spite of interferences thousands of times larger than the input signal.
4) Differential inputs and high common mode rejection eliminate measurement errors caused by potential differences between ground at the flowmeter probe and ground at the electronics package.

Figure 5:
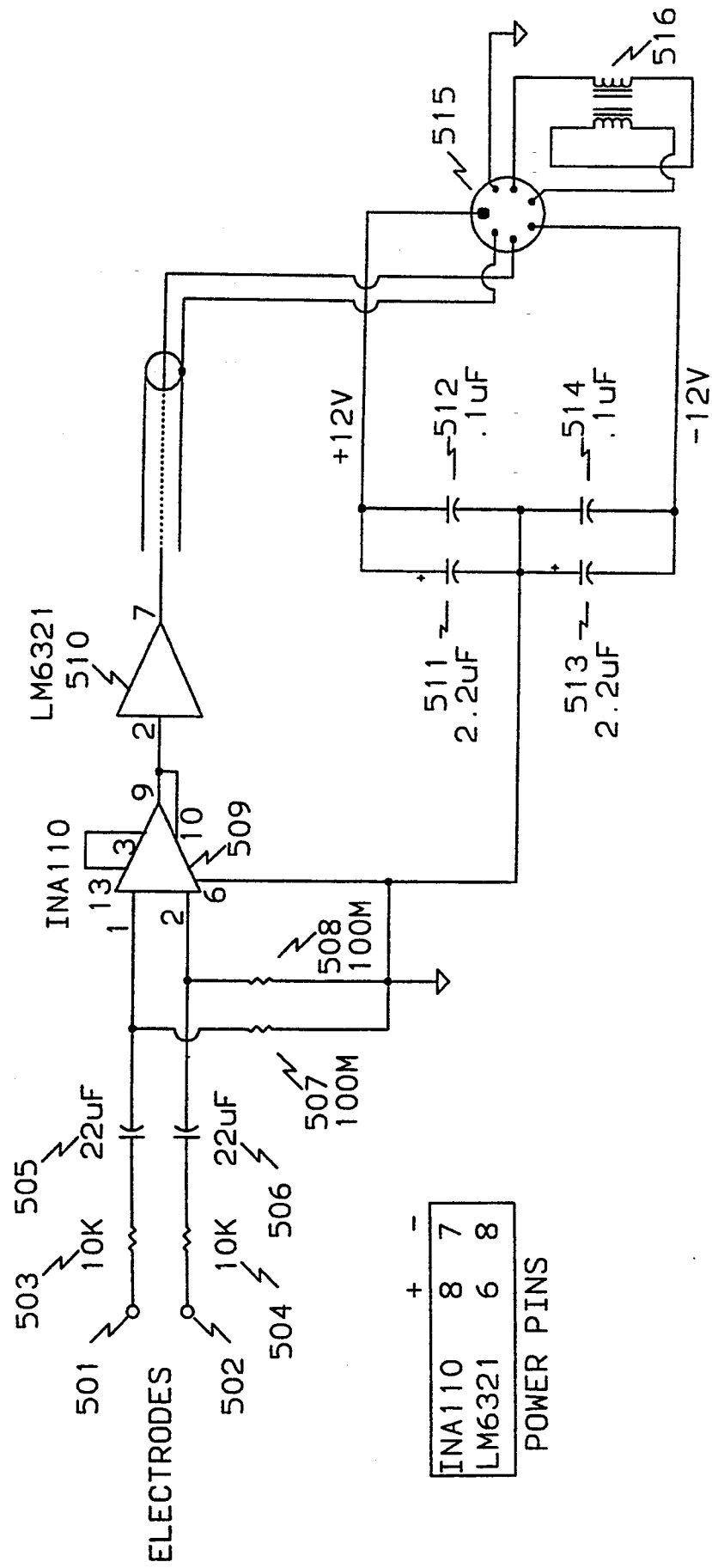
FIG. 5 illustrates by means of a schematic diagram the sensing electrodes, integrated electronics, and the electromagnet utilized in the flowmeter probe.

Referring now more specifically to FIG. 5, therein is illustrated by means of a schematic diagram, one method of obtaining the advantages described above. The schematic diagram in FIG. 5 illustrates the sensing electrodes, integrated electronics and electromagnet contained in the flowmeter probe. The coil assembly for the electromagnet 516 consists of two coils of small diameter copper wire connected in series.

Electrodes 501 and 502 used in the flow probe are made of sintered silver-silver chloride. Instrumentation amplifier 509 adequately satisfies the requirements for low input bias current and high input impedance. Typical values are $20 \times 10^{-12}$ amps input bias current, and $5 \times 10^{-12}$ ohms input impedance. The buffer amplifier 510 provides signal drive to allow operation with several thousands of feet of cable.

Referring still to FIG. 5, Mylar capacitors 505 and 506 provide AC coupling between the silver-silver chloride electrodes 501 and 502 and the instrumentation amplifier 509, eliminating any DC offset voltage. Resistors 503 and 504 help limit high frequency gain and ensure stability. Resistors 507 and 508 provide a return path for the input bias currents to assure proper operation and stability of the amplifier. Tantalum capacitors 511 and 513 and disc ceramic capacitors 512 and 514 provide low frequency and high frequency power supply by-passing, respectively.

The interconnecting cable which mates with underwater connector 515, has multiple conductors to supply power to instrumentation amplifier 509 and buffer amplifier 510, isolated power to electromagnet 516, and the signal from the flowmeter probe to the electronics package. The cable also provides support for the flowmeter probe. Underwater connector 515 provides a waterproof connection between the flowmeter probe and the cable.

Referring back to FIG. 4, the electronics package consists of a weather proof enclosure containing a printed circuit board, two power supplies and a digital panel meter (DPM). The printed circuit board contains digital timing circuits 407, magnet drive 406, and all analog sampling and signal conditioning electronics. The ±12 volt power supply 417 provides power for all signal conditioning and sampling electronics, and +12 volt supply 418 provides power for the magnet drive circuit and the flow probe electromagnet.

Oscillator 408 is the master clock for the digital timing circuits. All timing signals in the EBF are derived from this oscillator. If AC power is available, the oscillator can be synchronized to the 60 hertz AC power line; the oscillator will free run if the flowmeter is battery operated. The output of the oscillator is a square wave, and an example of this waveform is MASTER CLOCK, shown in FIG. 9.

Figure 6:
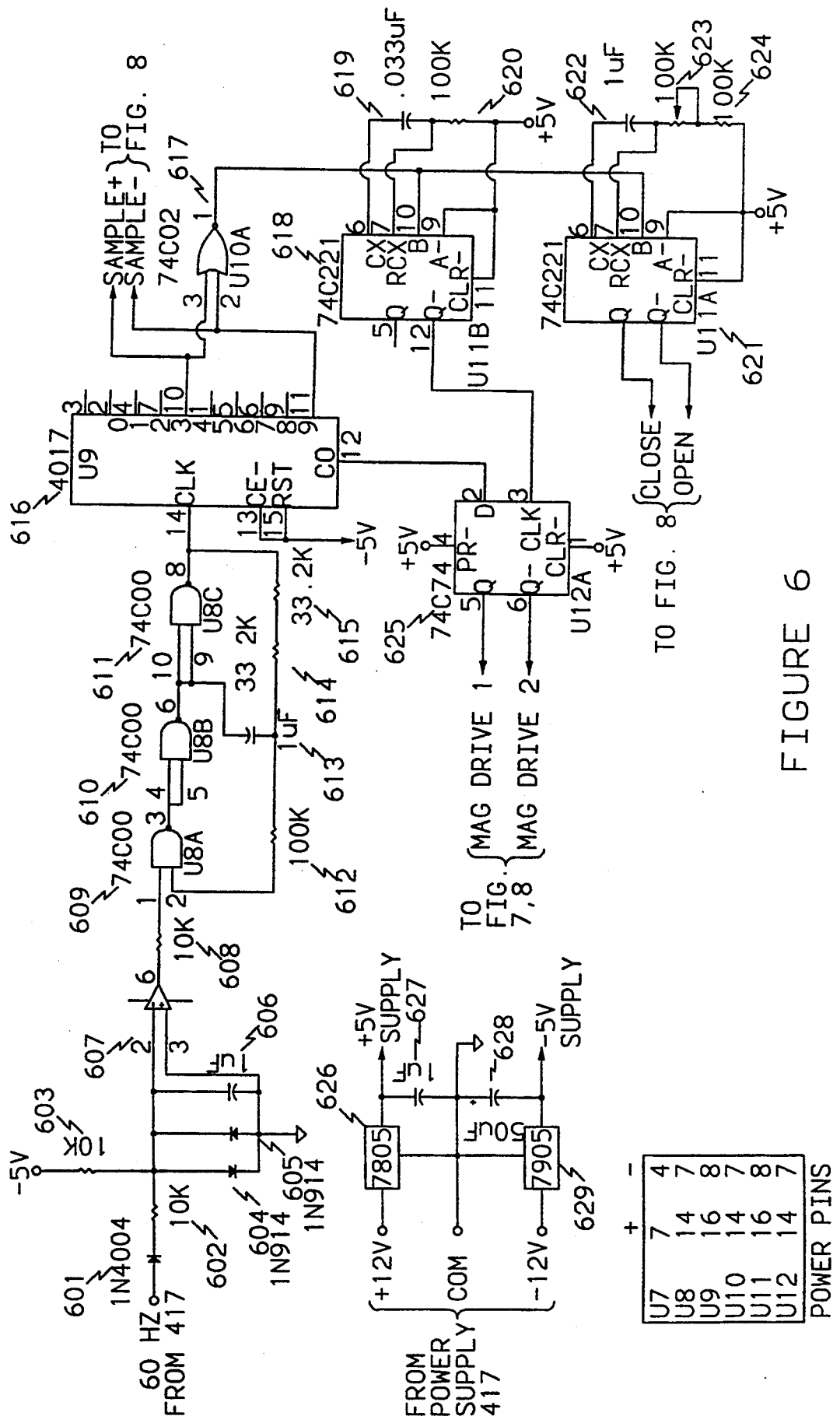
FIG. 6 illustrates by means of a schematic diagram the digital timing circuits utilized in the electronics package.

Referring now more specifically to FIG. 6, therein is illustrated by means of a schematic diagram, one method of implementing the synchronization circuitry, the oscillator and the digital timing circuits. It should be noted that in this FIGURE and following FIGURES wherein digital logic gates and circuits such as NAND, NOR, INVERTERS, etc., are illustrated, for the convenience of the reader the industry standard pin numbers have been incorporated at each connection to the gate or circuit. For instance, gates U8A, U8B, AND U8C are three of four gates supplied in an integrated circuit package by several manufacturers. Positive and negative power supply connections are documented in the POWER table contained in each figure where appropriate. For example, the positive power supply connects to pin 14 of U8, and the negative power supply connects to pin 7 of U8.

Twelve volts AC from the transformer of power supply 417 can be connected to provide synchronization to the 60 hertz AC power line. Diode 601 provides half-wave rectification of the AC signal. Resistors 602 and 603 provide biasing for operational amplifier 607 which is used as a comparator to convert the rectified 60 hertz AC signal to a 60 hertz square wave with transitions at zero and 180 degrees of the sine wave. The 60 hertz square wave switches between +5 volts and −5 volts. Diodes 604 and 605 clip the waveform symmetrically and protect operational amplifier 607. Capacitor 606 increases stability. NAND gates 609–611 are configured as a gated oscillator. If 60 hertz AC is present from the transformer of power supply 417, the oscillator is synchronized to the AC power line through resistor 608 which provides current limiting. If 60 hertz AC is not present, the oscillator frequency is determined by resistors 614 and 615 and capacitor 613. Resistor 612 provides increased stability for the oscillator. The output of the oscillator (pin 8 of 611) is a square wave with a positive amplitude of +5 volts, and a negative amplitude of −5 volts. The waveform is shown as MASTER CLOCK in FIG. 9.

Referring back to FIG. 4, the digital timing circuit 407 generates the timing signals to synchronize the magnet drive 406, analog pi switch 410, and synchronous sampling circuit 413. The timing signals are used to create a low frequency drive voltage for the flow probe electromagnet, and to control signal sampling in the signal conditioning electronics. In the particular arrangement using a Johnson counter with 10 outputs, it will be appreciated that the frequency of such drive voltage is 6 hertz.

Referring again to FIG. 6, one method of generating the timing signals is shown. The square wave signal at pin 8 of NAND gate 611 drives the CLOCK input of counter 616. This 4017 counter is a five-stage Johnson counter with ten outputs. It should be emphasized that the 4017 counter was used as a matter of convenience, since one was handy, and other counters, such as a 4022 for example, which is a four-stage Johnson counter with eight outputs will also work. Each output of counter 616 goes high at its respective time slot and stays high for one full clock cycle, $T_1$. This output is high six times per second. Only one output at a time can be high, and each is synchronized with the master clock. This timing relationship is shown by the waveforms labelled SAMPLE+ and SAMPLE− in FIG. 9, which are two of the ten counter outputs.

Figure 9:
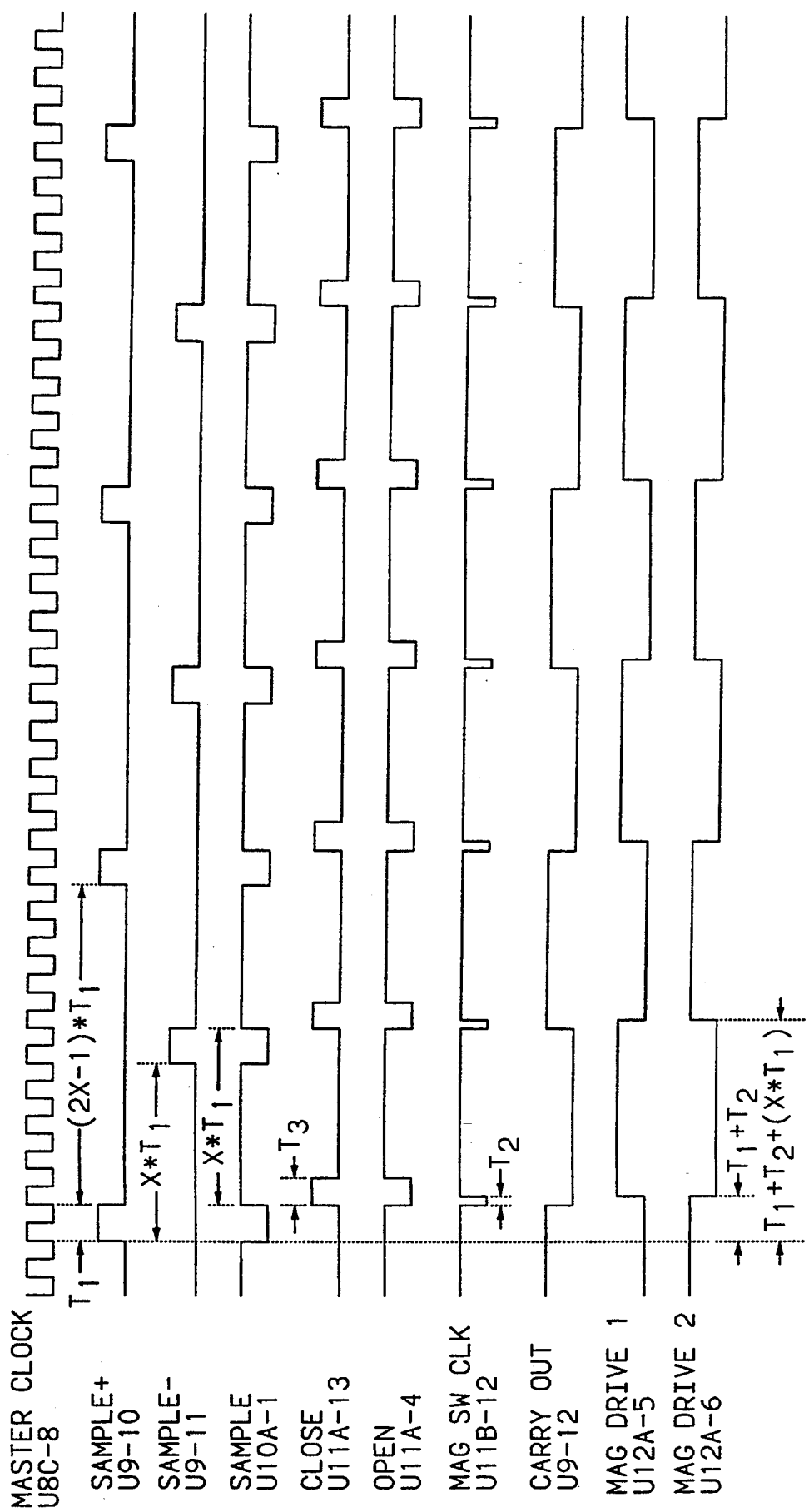
FIG. 9 illustrates by means of a timing diagram the timing relationship between the magnet drive, the pi configured CMOS analog, and the synchronous RC sampling network.

Counter outputs 4 (pin 10 of 616) which is SAMPLE+ in FIG. 9, and 9 (pin 11 of 616) which is SAMPLE− in FIG. 9, and CARRY OUT (pin 12 of 616) are used to generate the synchronization signals for magnet drive 406, analog pi switch 410, and the synchronous sampling network 413. Referring again to FIG. 9, each output of the counter (SAMPLE+ and SAMPLE−) is high for one clock period $T_1$, and low for nine clock periods. CARRY OUT (pin 12 of 616) goes low when SAMPLE+ (pin 10 of 616) goes low, and goes high when SAMPLE-(pin 11 of 616) goes low.

Counter outputs 4 and 9 are gated by NOR gate 617. Pin 1 of NOR gate 617 (the waveform labelled SAMPLE in FIG. 9) is normally high and goes low each time one of the inputs goes high. Each time the signal returns to the high state it triggers the monostable multivibrators 618 and 621. Capacitor 619 and resistor 620 form a timing network for 618 and provide an output pulse of approximately 3 milliseconds. The width of this output pulse is not critical since its purpose is to clock D flip-flop 625 which generates the magnet drive signals. To reliably clock the D flip-flop 625, the pulse must be greater than $16 \times 10^{-9}$ seconds, and must be less than about one-third the width of $T_3$, shown in FIG. 9, so that the switching transients have time to decay before the end of $T_3$. Capacitor 622, resistor 624 and potentiometer 623 form a timing network for 621. Potentiometer 623 is adjusted to give an output pulse that is longer than the transients generated by the magnetic collapse/build when the polarity of the drive signal to the magnet is switched, see $T_3$ on FIG. 9. This pulse width is determined by using a dual channel oscilloscope to observe the signal at pin 6 of operational amplifier 808 shown in FIG. 8 on one channel, and pin 13 or pin 4 of monostable multivibrator 621 shown in FIG. 6 on the other channel, and adjusting potentiometer 623.

In the description of NOR gate 617, supra, counter outputs 4 and 9, which are gated thereby, have previously been described as being high for one full clock period and, in the case of this particular 5 stage/10 output counter, low for the other 9 clock periods of a full cycle. It is, of course, conceivable that a counter could have been selected wherein each of its outputs go low for one clock period and high for the other clock periods, in which case NOR gate 617 would need to be replaced by an AND gate if trigger coupling to multivibrators 618 and 621 were to remain as described. Since it will be appreciated by those skilled in this art that the triggering of events by logic circuit components are of particular interest in obtaining the stated objects rather than particulars related to default characteristics thereof as either being high or low and going either low or high. It has been deemed necessary to utilize an alternative set of descriptors for such event occurrences. Therefore, in describing and claiming some of the logic components of the instant invention, a certain latitude is hereby taken to describe such occurrences in terms of "inactivated mode" and "activated mode." Thus, counter 616 output 4, or for that matter counter 616 output 9, is in the inactivated mode (defaults to low) for 9 clock periods and in the activated mode (goes high) for one clock period. Likewise, NOR gate 617, which is normally high and goes low each time output 4 or 9 goes high, could, in this vernacular, be described as a gate which is in the inactivated mode (defaults to high) when either counter 616 output 4 or 9 is in the inactivated mode (defaults to low) and changes to the activated mode (goes low) when either output 4 or 9 goes high, or in this vernacular, switches into the activated mode. Similar descriptions of other logic circuit components are applicable. Accordingly, as used herein the term "inactivated mode" is used to describe or refer to the state of circuit components which may be either normally high or low in their default mode. As used herein the term "activated mode" is used to describe or refer to the state of circuit components which may be either normally high or low in such inactivated mode but have been triggered by output coupled thereto to either change from a default low mode to an activated high mode or from a default high mode to an activated low mode. When it is understood and appreciated how to apply these terms in the normal connotation intended herein, it should be apparent that further references thereto can correctly and adequately describe their utilization and functions regardless of the particular characteristics built thereinto by the manufacturer. It is anticipated that this explanation will expedite any desired substitution of equivalent components by the reader and allow him/her to make proper substitutions as may be desired.

CARRY OUT from counter 616 drives the D input of flip-flop 625. This signal is latched at the Q output (pin 5 of 625) when the clock input (pin 3 of 625) goes high caused by the trailing edge of the signal from pin 12 of 618. The waveforms generated at pins 5 and 6 of flip-flop 625 provide the control signals for the magnet drive 406, the input offset circuit 409, the analog pi switch 410 and the synchronous sampling network 413. These waveforms are MAG DRIVE 1 and FLAG DRIVE 2, respectively in FIG. 9.

Referring still to FIG. 6, +12 volts DC, common, and −12 volts DC from the main power supply drive the voltage regulators 626 and 629. The 7805 voltage regulator 626 provides +5 volts which is used as the positive power supply for the digital logic circuits, and the 7905 voltage regulator 629 provides −5 volts which is used as the negative power supply for the digital logic circuits. Capacitors 627 and 628 provide by-passing and improve stability.

Referring back to FIG. 4, magnet drive 406 provides isolation between power supply 417 for the electronics and power supply 418 for the electromagnet, and generates the adjustable square wave drive voltage for the electromagnet. The drive voltage is adjustable in order to permit the maximization of the signal-to-noise ratio from the flow probe when the length of the multiconductor cable is changed. A long cable necessary to measure flow in a deep well requires a higher magnet drive voltage due to the added electrical resistance of the cable.

Another embodiment of the instant invention incorporates modification of the magnet drive to thereby continuously supply a constant current to the electromagnet, rather than manually adjusting the voltage upstream of the multicable connector to compensate for changes in impedance and to thereby effect a constant voltage downstream of the multicable connector, i.e. at the probe. Such constant current magnet drive allows for different length cables to be used between the electronics package and the flow probe without requiring recalibration of the flowmeter. Although not shown, one convenient arrangement utilized to effect these results includes in, for example, magnet drive 406 a dropping resistor coupled with comparator means and adapted with amplifier means to sense current to the electromagnet and automatically compensate for variance thereof from predetermined levels.

Figure 7:
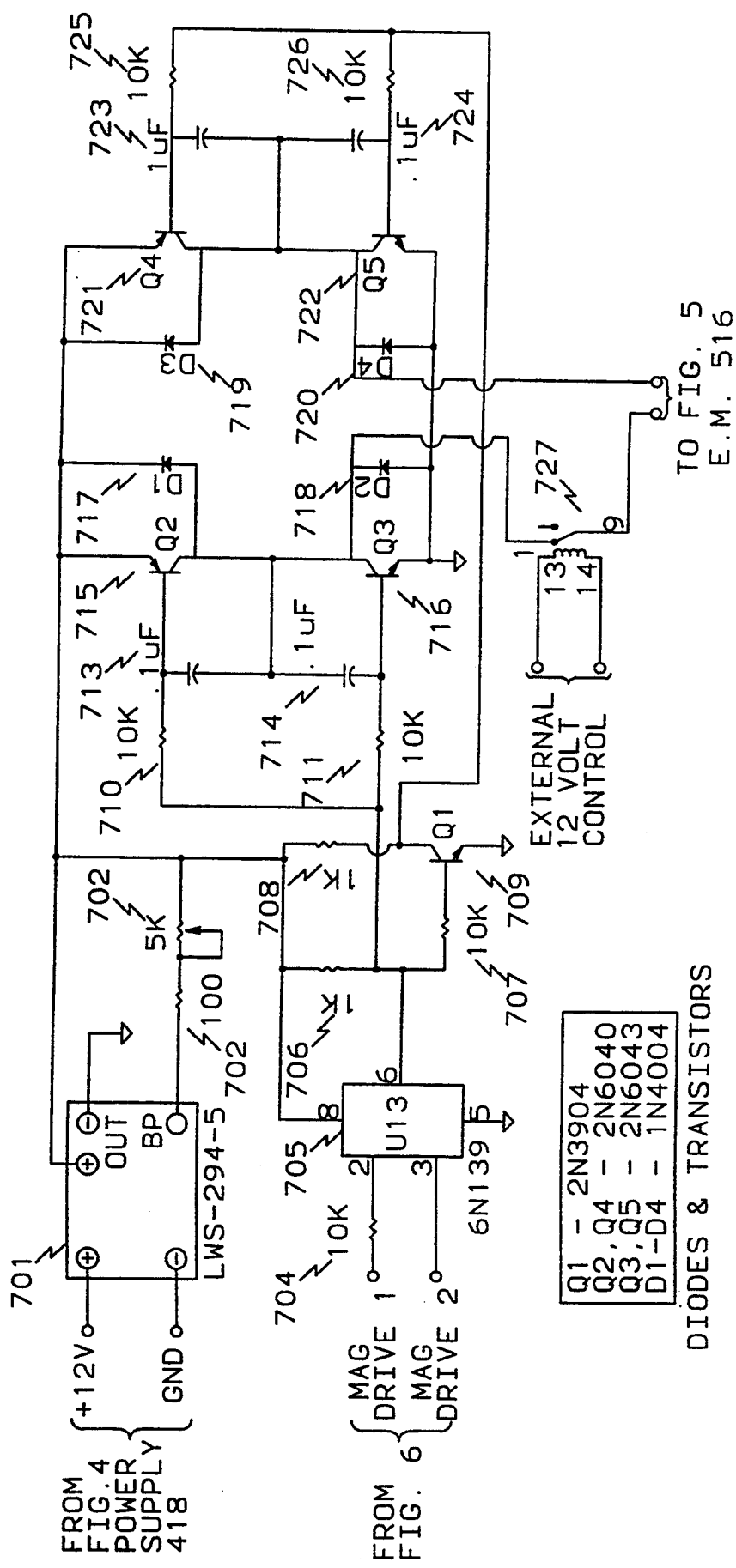
FIG. 7 illustrates by means of a schematic diagram the electromagnet power supply and variable voltage drive circuit.

Referring now more specifically to FIG. 7, therein is illustrated by means of a schematic diagram, one method of generating the magnet drive voltage. The 12 volt electromagnet power supply 418 connects to adjustable, switching voltage regulator 701. A switching regulator is used to limit power losses that occur in a regulator when the regulator's output voltage is appreciably less than the input voltage. Resistor 702 and potentiometer 703 provide a means to control and adjust the output voltage of switching regulator 701.

Optical isolator 705 provides isolation between power supply 417 for the digital timing circuit and the signal conditioning circuit, and power supply 418 for the electromagnet drive circuit. By isolating the two power supplies, thus keeping the ground return paths separate, interference in the signal conditioning and sampling circuits from the electrical noise generated by switching the drive voltage to the electromagnet is minimized. Referring again to FIG. 6, the waveforms generated at pin 5 and pin 6 of 625 provide the drive signal for the internal photo diode (not shown) of optical isolator 705. These waveforms are shown as MAG DRIVE 1 and MAG DRIVE 2 in FIG. 9. Resistor 704 provides current limiting to protect said photo diode.

Resistors 706 and 708 serve as collector load resistors for optical isolator's output transistor (705 pin 6) and transistor 709, respectively. Resistor 707 is the input resistor for transistor 709. The waveforms at pin 6 of optical isolator 705 and the collector of transistor 709 are square waves with a period of $10T_1$ where $T_1$ is the period of the MASTER CLOCK shown in FIG. 9. The waveforms are 180 degrees out of phase. These waveforms are the input signals for power Darlington transistors 715, 716, 721 and 722. Resistors 710, 711, 725 and 726 provide base drive for said Darlington transistors.

Darlington transistors 715, 716, 721 and 722 supply the drive voltage for electromagnet 401 located in the flowmeter probe. Diodes 717, 718, 719 and 720 protect the transistors from transients caused by the collapse/build of the electromagnet when the drive voltage switches. Capacitors 713, 714, 723 and 724 slow the turn on of the transistors which in turn slows the rise time of the electromagnet drive waveform in order to reduce switching transients caused by the inductance of the electromagnet.

When the waveform at pin 6 of 705 is high, the collector of transistor 709 is low, and Darlington transistors 716 and 721 are on. The positive output of switching regulator 701 goes to the electromagnet through transistor 721 and returns to common through relay 727 and transistor 716. When the waveform switches, transistors 715 and 722 are on. The positive output of the switching regulator 701 goes to the electromagnet through transistor 721 and returns to common through relay 727 and transistor 716. When the waveform switches, transistors 715 and 722 are on. The positive output of the switching regulator 701 goes to the electromagnet through transistor 715 and relay 727, and returns to common through transistor 722. The waveform to the electromagnet is thus a modified square wave with a finite rise time that switches polarity every five cycles of the MASTER CLOCK.

The normally closed contact of relay 727 is in series with the electromagnet drive voltage. The drive voltage can be interrupted by connecting an external +12 volt control signal to the terminals.

Referring back to FIG. 4, an AC signal proportional to flow comes from the flow probe through the multiconductor cable to amplifier and input offset adjustment section 409 of the signal conditioning electronics. The amplifier increases the AC signal and removes the DC component from the signal. The offset adjustment matches the flow probe to the signal conditioning electronics, so that with no flow through the flow probe, the output signal is zero.

Figure 8:
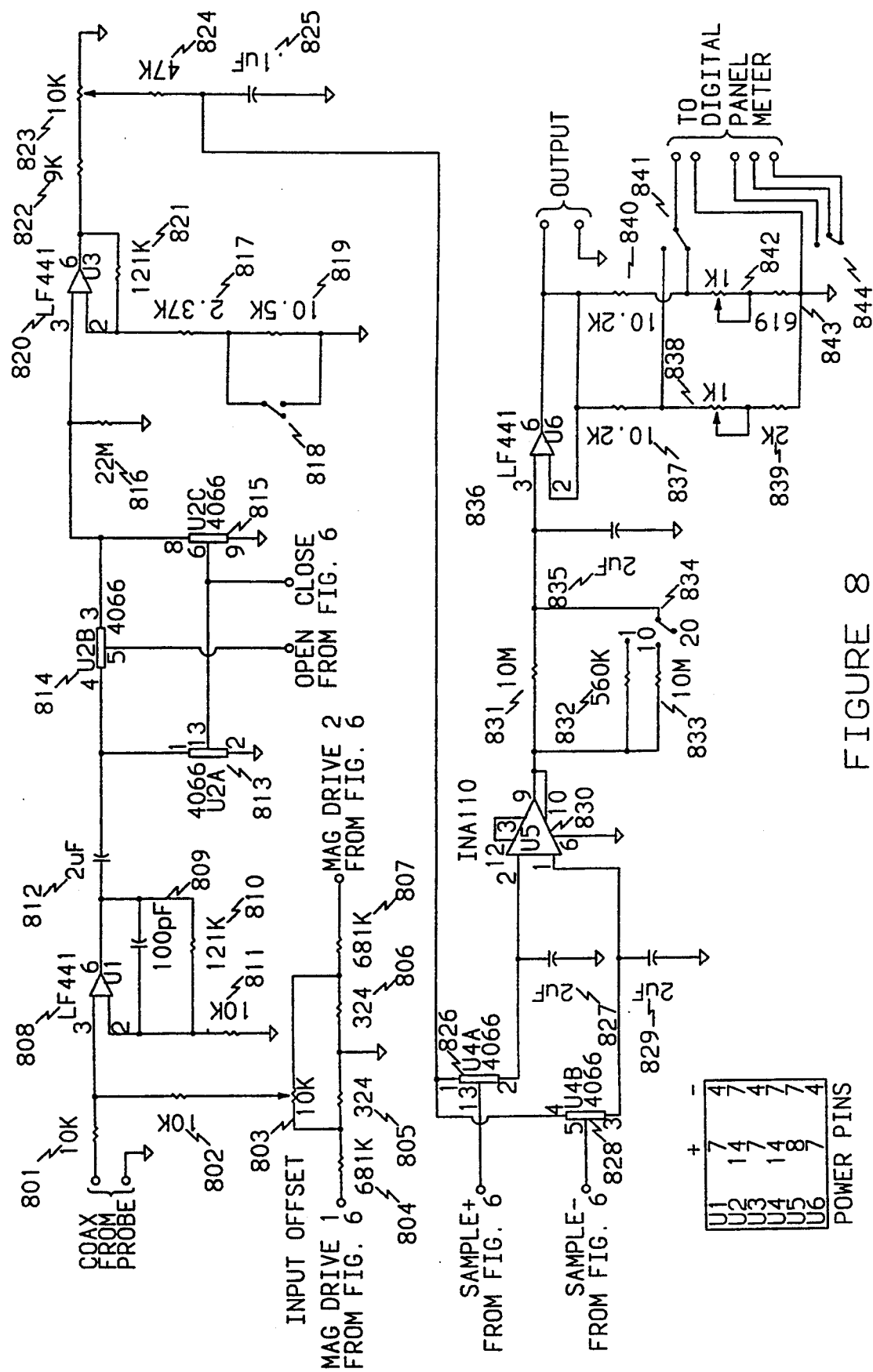
FIG. 8 illustrates by means of a schematic diagram the conditioning electronics utilized on the signal received from the probe via the connection cable comprising an amplifier, a pi configured CMOS analog switch, a range select amplifier, a synchronous sampling network, an integrator, and a scaling network.

Referring now more specifically to FIG. 8, therein is illustrated by means of a schematic diagram the conditioning electronics utilized on the signal received from the probe via the connection cable. The multiconductor connection cable between the flow probe and electronics package contains a coaxial cable. The coaxial cable carries the output signal from the flowmeter probe to the signal conditioning electronics. The inner conductor of the coaxial cable carries the signal to resistor 801 while the shield connects to signal common.

Resistors 801 and 802 form a summing junction for the output signal from the flowmeter probe and the input offset voltage. Generating an offset voltage and summing the offset voltage with the output signal from the flow probe in this manner is one method of matching the flow probe to the signal conditioning electronics. The input offset voltage is derived from MAG DRIVE 1 and MAG DRIVE 2 shown in FIG. 9, generated by flip-flop 625 shown in FIG. 6. Resistors 804, 805, 806 and 807 form a voltage divider to scale the offset voltage. With no flow through the flowmeter probe, potentiometer 803 is adjusted for zero volts at the terminals marked OUTPUT in FIG. 8. This matches the flowmeter probe to the signal conditioning electronics.

Amplifier 808 is configured as a voltage follower with a gain of 13.1 as determined by resistors 810 and 811. It should be emphasized that the gain of any one stage of the signal conditioning electronics is not critical in and of itself. The overall gain of the total system, including the amplifier in the flow probe must be sufficient to generate a suitable signal to measure with a digital voltmeter or similar measuring device. Various combinations of gain will work as long as this requirement is met. Capacitor 809 limits the bandwidth of amplifier 808. Capacitor 809 is sized to attenuate high frequency noise, but not the input signal. Capacitor 812 and resistor 816 AC couples the signal to remove any DC offset.

Referring back to FIG. 4, the Analog Pi Switch 410 serves to block switching transients generated in the flow probe and picked up by the electrodes. Large transients are generated when the drive voltage to the electromagnet reverses polarity. If the switching transients are not blocked or clamped, saturation of the signal conditioning electronics will occur. Until the pi-configured analog switch was designed our efforts to achieve a stable reading at fluid velocities of about 0.001 feet per second had been unsuccessful.

Referring again to FIG. 8, one method of implementing the pi-configured analog switch is shown. Analog switches 813, 814 and 815 make up the circuit. Shortly before the drive voltage to the electromagnet changes polarity, switches 813 and 815 close, and switch 814 opens. The pulse that opens switch 814, shown as OPEN in FIG. 9, and closes switches 813 and 815, shown as CLOSE in FIG. 9, is adjusted by using a dual channel oscilloscope to observe the signal at pin 6 of operational amplifier 808 shown in FIG. 8 on one channel, and pin 13 or pin 4 of monostable multivibrator 621 shown in FIG. 6 on the other channel, and adjusting potentiometer 623. The pulse width must be wider than the switching transients seen at pin 6 of operational amplifier 808. This effectively blocks the switching transients from the signal conditioning electronics, and zeroes the input of operational amplifier 820 to prevent noise pickup due to the high input impedance of the amplifier. The timing relationship between the magnet drive signals MAG DRIVE 1 and MAG DRIVE 2, and the switch control signals OPEN and CLOSE, is shown in FIG. 9.

Referring back to FIG. 4, the range select amplifier 411 and the gain adjust section 412 permits the desired flowmeter range to be selected and the overall gain to be set. During flowmeter calibration, the gain potentiometer is adjusted to make the flowmeter output read correctly with a known flow passing through the flow probe.

Referring again to FIG. 8, one method of implementing the range selection and gain adjustment is shown. Operational amplifier 820 has a switch selectable gain of 10.4 or 52, determined by resistors 817, 819 and 821, and section A, 818, of the range switch. Switch 818 selects the flowmeter's typical full-scale range of 0–1 foot per second, or 0–5 feet per second. Resistor 822 and potentiometer 823 provide a gain adjustment for the system. If full scale ranges other than 0–1 or 0–5 feet per second are required, the gain potentiometer can be adjusted and, if necessary resistor 822 can be changed to a different value. While these are the gain values currently used in the instant invention, the gain of any one stage of the signal conditioning electronics is not critical in and of itself. The overall gain of the total system, including the amplifier in the flow probe must be sufficient to generate a suitable signal to measure with a digital voltmeter or similar measuring device. Various combinations of gain will work.

Referring back to FIG. 4, the synchronous sampling network 413 provides a means of measuring the AC signal when a minimum of switching noise is present, and representing the peak to peak value of the signal as a stable DC voltage.

Refer again to FIG. 8 for one method of implementing a synchronous sampling network. Resistor 824, capacitor 825 analog switches 826 and 828, capacitors 827 and 829, and instrumentation amplifier 830 form a synchronous sampling network. The analog switches alternately close for a time $T_1$ which is the period of the master clock, immediately prior to the switching of the magnet drive voltage. Refer to the waveforms labelled SAMPLE+ and SAMPLE− in FIG. 9 to see the timing relationship of MAG DRIVE 1, MAG DRIVE 2, SAMPLE+ and SAMPLE−. Waiting for the last cycle before the magnet drive voltage is switched provides maximum time for the signal to stabilize after the previous switching of the magnet drive voltage. When analog switch 826 is closed, capacitor 827 charges to the positive peak value of the input signal; when analog switch 828 is closed, capacitor 829 charges to the negative peak value of the input signal. The input to instrumentation amplifier 830 is then the peak to peak DC value of the AC input signal. Amplifier 830 has extremely high input impedance so that capacitors 827 and 829 maintain their charge between sample periods. If the amplifier did not have a high input impedance, the capacitors would "bleed", or lose charge, through the inputs of the amplifier to ground, between samples.

Analog pi switch 410, discussed previously, works in conjunction with synchronous sampling network 413 to reduce system noise and produce a stable DC output. During operation, analog pi switch 410 is active during $T_3$, shown in both the OPEN and CLOSE waveforms in FIG. 9, thereby blocking, or deselecting, the signal from the flowmeter probe during switching of the polarity of the magnet drive voltage, shown as MAG DRIVE 1 and MAG DRIVE 2 in FIG. 9. During the remainder of the interval ($X*T_1$) in FIG. 9 (a time equal to $(X*T_1)-T_3$), the analog pi switch is inactive thereby coupling the signal from the probe to the signal conditioning circuitry. At a time $T_1$ before the end of the current interval $X*T_1$, or $(X-1)*T_1$, the synchronous sampling network is activated for a time $T_1$ to sample the signal by charging capacitors 827 or 829 depending on whether SAMPLE+ or SAMPLE− is active.

Referring back to FIG. 4, the integrator 414 provides additional noise filtering, or signal averaging. Referring again to FIG. 8, one method of implementing a versatile integrator is shown. Resistors 831, 832 and 833, switch 834, capacitor 835 and operational amplifier 836 form an integrator with a switch selectable time constant. Time constants available in the current configuration of the instant invention are 1, 10, and 20 seconds. Other values for the time constants will work equally well. The shortest time constant provides the quickest settling time, while the longest time constant yields the most stable output signal. The output signal from operational amplifier 836 is ±5 volts.

Still referring back to FIG. 4, scaling network 415 scales the ± volt output signal from the integrator 414 so that digital panel meter (DPM) 416 will read directly in engineering units. Referring again to FIG. 8, resistors 837, 839, 840 and 843, and potentiometers 838 and 842 form the scaling network for DPM 416. Sections B, 841, and C, 844, of the range switch, direct the signal to DPM 416 and change the decimal point to make DPM 416 read directly in feet per second for both ranges (0–1 and 0–5 fps). It should be noted that the range switch is comprised of three sections, 818, 841 and 844.

Figure 10:
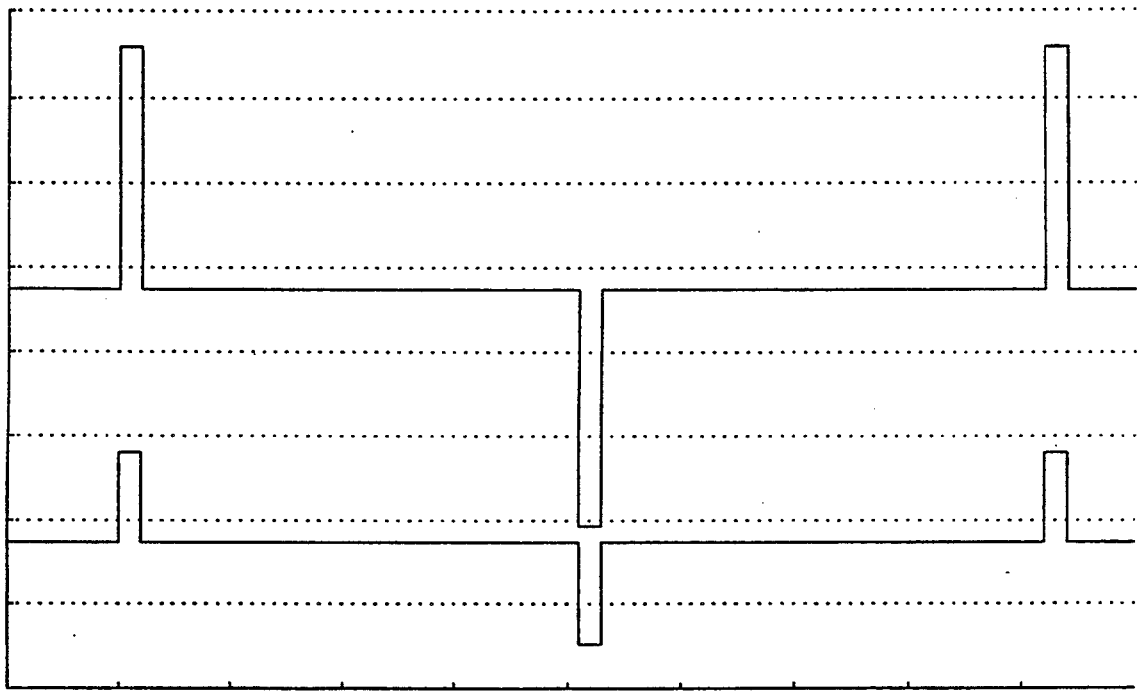
FIG. 10 illustrates by means of an enhanced reproduction of a digital oscilloscope trace, a before and after rendition of the effectiveness of the analog pi switch in removing switching transients from the signal incoming from the electrodes and through various conditioning components. For convenience to the reader, the scope plot was enhanced in the vein of a continuous line analog output whereby the trace particularly in the spiked portions has been filled in. Theoretically, particularly in view of the waveform shown in FIG. 9, supra, such removal should not be necessary, since the signal is not sampled until well after the spikes or transients caused by reversal of the polarity to the electromagnets in the probe, have decayed. It has been discovered, however, that even though the sampling does not occur until well after the spikes or transients have decayed, due to the relatively high energy contained in the spikes or transients, and the long time constants utilized in the signal conditioning circuitry, these spikes or transients cause small, random drift in the output signal, thus limiting the accuracy of the flow measurement. Thus, in FIG. 10, the upper oscilloscope trace in graph A represents the output from pin 6 on gain amplifier 820 in FIG. 8 with analog switches 813, 814, and 815 removed, and a wire connected from the right side of capacitor 812 to pin 3 of gain amplifier 820 to provide a signal path. In comparison therewith, the upper trace in graph B illustrates the operational mode of the instant invention, again from pin 6 of amplifier 820, with analog switches 813, 814, and 815 installed, and the switching transients accordingly removed from the signal.
Figure 10:
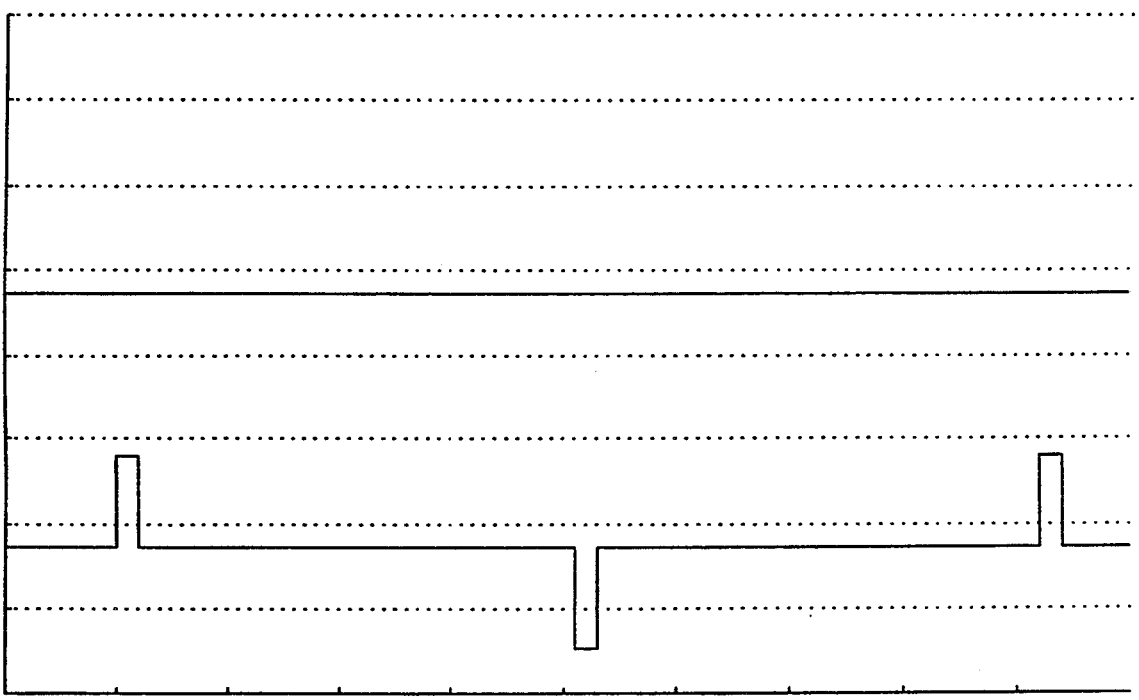

Referring now more specifically to FIG. 10, therein is illustrated by means of an enhanced reproduction of a digital oscilloscope trace, a before and after rendition of the effectiveness of the analog pi switch in removing switching transients from the signal incoming from the electrodes and through various conditioning components. For convenience to the reader, the scope plot was enhanced in the vein of a continuous line analog output whereby the trace, particularly in the spiked portions, has been filled in. Theoretically, particularly in view of the waveform shown in FIG. 9, supra, such removal should not be necessary, since the signal is not sampled until well after the spikes or transients caused by reversal of the polarity to the electromagnets in the probe, have decayed. It has been discovered, however, that even though the sampling does not occur until well after the spikes or transients have decayed, due to the relatively high energy contained in the spikes or transients, and the long time constants utilized in the signal conditioning circuitry, these spikes or transients cause small, random drift in the output signal, which limits the accuracy of the flow measurement. Thus, in FIG. 10, the upper oscilloscope trace in graph A represents the output from pin 6 on gain amplifier 820 in FIG. 8 with analog switches 813, 814, and 815 removed, and a wire connected from the right side of capacitor 812 to pin 3 of gain amplifier 820 to provide a signal path. The lower oscilloscope trace in graph A represents the signal at the right side of capacitor 812 in FIG. 8. In comparison therewith, the upper trace in graph B illustrates the operational mode of the instant invention, again from pin 6 of amplifier 820, with analog switches 813, 814, and 815 installed, and the switching transients accordingly removed from the signal. The lower oscilloscope trace in graph B is identical to the lower trace in graph A, representing the signal at the right side of capacitor 812.

For the purpose of reference, the sweep rate of the digital oscilloscope is 20 milliseconds per division, and the width of graphs A and B represents 200 milliseconds. The upper oscilloscope traces in graphs A and B in FIG. 10 have a vertical gain of 0.5 volts per division, and the lower traces have a vertical gain of 20 millivolts per division. Thus, the upper oscilloscope trace in graph A shows a peak amplitude of approximately 1.5 volts, while the lower traces in graphs A and B has a peak amplitude of approximately 30 millivolts.

DESCRIPTION OF THE PREFERRED EMBODIMENTS

The present invention relates to the area of activities utilized to effect characterizing various aquifer properties, more specifically it relates to designing means and methods for utilizing such means to more effectively measure spatial variability of hydraulic conductivities, particularly in aquifer sediments. Results, to date, indicate that the representation of an aquifer's three-dimensional hydraulic conductivity is a key component associated with solute transport predictions required for addressing concerns relating to groundwater pollution abatement. Of the various methods investigated, for determining hydraulic conductivities, the borehole flowmeter method, which measures the incremental discharge along a fully screened well during relatively small-scale pumping tests, proved to be the most promising. As noted elsewhere, several means or devices are available and/or have been modified in order to increase the accuracy, precision, and durability of prior-art flowmeter equipment. The accuracy and precision requirement for such devices is dictated by the large variability of hydraulic conductivities in different aquifers. The requirement for durability is dictated, at least in part, by the plethora of tests which must be made at a given site. Accordingly, it has been a primary object of the instant invention to design, test, improve, and produce a device which will effect substantially improved results for measuring flow rates in groundwater wells and like conduits which are accessible only from their insides. The device must necessarily fit within a conduit measuring only about 2 inches in diameter, but also be adaptable for utilization in conduit or wells of substantially larger diameters. Since the device is utilized for measuring flow rates at different locations within a conduit, the size of which may vary with a change in the axial position therein, it is imperative for purposes of accurate measurements that all of the flow in such conduit be directed through the flowmeter, even though there may be substantial size mismatches between its outer diameter and the inner diameter of such conduits.

As indicated, supra, the instant invention is described both in toto and in at least two separate embodiments thereof, wherein the first embodiment the device of the instant invention comprises at least two principal components, to wit, the probe and the electronics package in operable association with said probe, and in the second embodiment thereof, wherein there are substantial size mismatches between the outer diameter of the probe and the inner diameter of the conduits, an inflatable packer assembly in combination with the probe and the electronics package, supra. The probe component of the flowmeter generally comprises an electromagnet fashioned in a hollow cylindrical shape and two diametrically opposed electrodes. A line drawn between the centers of both electrodes is generally perpendicular to the initial flux field generated by the poles of the electromagnet. The water or other fluid which is subject to measurement of flow rate by the meter is caused to flow through such hollow shape in a direction which is perpendicular to the flux field. Accordingly, by Faraday's Law of Induction, the electrodes will measure the voltage induced by the flowing water conductor moving at right angles through the field, and such induced voltage will be directly proportional to the velocity of such flowing water.

A multiconductor cable between the probe and the electronics package operatively associates the flow probe's integrated electronics with that of the electronics package. It also carries the power required to drive the electromagnets located in the probe. Given the parameters of a cable connection oftentimes well in excess of 1000 feet between the probe and the electronics package and the associated DC line losses, and also given that with a DC field in such electromagnet, the voltage across the interfaces resulting from the mechanical discontinuities of flowing water separating the two electrodes is in series with the flow signal. Random drift of this signal is about the same size and indistinguishable from the flow signal. In addition, with DC field there tends to be polarization between the electrodes thereby causing further flow measurement errors. Accordingly, it is appreciated that the use of an AC field greatly reduces the chance that many such errors introduces including reducing the polarization of the electrode and also allows the use of filtering to eliminate the voltage drift common to the use of DC fields as mentioned above. On the other hand, a particularly major disadvantage with the use of AC field cores in the electromagnet is that they induce AC signals in the measuring circuit. Thus, when the supply voltage waveform to the electromagnet is AC, of the square wave type, a large spike is induced into the measuring circuit each time the square wave switches. The method of handling this problem and the technique therefore, together with supporting electronics, goes to the gist underlying the concept of the instant invention to provide a system and device having extremely high sensitivity to thereby accurately measure very small flow rates and also to provide for substantial accuracy throughout a fairly wide range of flow rates.

By a new and unique combination of timing circuit signaling there is provided synchronization between the probe magnet drive voltage and analog sampling circuits, these timing signals create a rather low frequency excitation voltage, in the particular embodiment shown hereafter, 6 hertz for the flow probe electromagnet and at the same time control sampling of the signal from the silver-silver chloride electrodes induced by the water flowing through the probe at right angles to the direction of the flux field induced by such electromagnets. The portion of the signal from the electrodes containing the spike and major harmonics thereof is disregarded by the sampling procedure by simply grounding same off through a CMOS pi-switch with the relative portion of the total sampling signal, so disregarded, being adjustable for calibration of the device and to ensure that switching of the voltage to the electromagnet in the probe and transients resulting therefrom from building to the field are not sampled. In addition, the circuitry anticipates that switching of the magnet drive voltage which will cause collapse/build and turns off the sampling procedure at a very small increment of time just prior thereto. Thus, the resulting sampled signal is pure and free of any spike or harmonics thereof resulting from the finite time necessary for field buildup or collapse/build in the electromagnet of the probe.

As previously mentioned and as used herein the terms "activated mode" and "inactivated mode" refer to, in their intended and normal connotation, the state of various electrical components which are otherwise vernacularized as being either low and going high upon being triggered or being high and upon triggering going low with the "inactivated mode" referring to the default sate of the device and "activated mode" referring to the triggered state. Thus, for example, in describing input to an OR gate, which is normally low and goes high each time the input thereto goes low, the reference could be to a gate device which changes from inactivated mode to activated mode when the output of the device coupled thereto changes from inactivated mode to activated mode.

EXAMPLES

In order that those skilled in the art may better understand how the present invention can be practiced, the following examples are given by way of illustration only and not necessarily by way of limitation, since numerous variations thereof will occur and will undoubtedly be made by those skilled in the art without substantially departing from the true and intended scope of the instant invention herein taught and disclosed.

EXAMPLE I

During early stages of development of the electromagnet flowmeter of the instant invention, a relatively simple yet quite accurate technique along with an inexpensive equipment setup was devised, developed, and tested for calibrating various prototypes of flowmeters including those of the impeller type under carefully controlled conditions. It very effectively simulated at least some of the conditions to which the devices would be exposed later in field trials. Accordingly, a 10-foot section of 2 inch ID Schedule 40 PVC pipe was orientated vertically and near the bottom thereof were provided a bottom port and a top port separated vertically from one another by about 42 inches. Also provided, was a middle port located about halfway between said top port and said bottom port. The flowmeter to be tested was lowered over the top of the pipe into the region thereof between the top and bottom ports with a coaxial cable connection to appropriate electronics situated on a bench juxtaposed said 10-foot section of pipe. Each of said top and bottom ports was adapted for connection with either a water supply or water discharge hose with the water discharge hose being introduced into a calibrated vessel so that the flow rate through the vertical section of pipe could be adjusted and carefully measured both with an inline meter inserted in the discharge hose and also by means of using said calibrated vessel and a stop watch to check the time/volume relationship of such discharge.

It is interesting to note that early in the testing with the device herein described for calibration of impeller type flowmeters to gain information for comparison with electromagnet flowmeters that a principal factor controlling the sensitivity of such impeller type flowmeters is the effective coefficient of friction between the impeller and support needle bearings. Indeed, it was determined that the amount of friction between the impeller and the needle bearing depends on the vertical adjustment of the bearing needles, the condition of the bearing surfaces including corrosion products thereon, and the relative sharpness of the needles.

Another important feature of this calibration equipment is that it is easily broken down and setup and therefore, mobile so that it can be easily transported and used at or near the testing site to check and monitor calibration of flowmeter equipment under extended periods of use and a variety of adverse conditions. Accordingly, during one 5-day test, which was conducted for study relating to improving the geohydrological aspects of certain bioreclamation projects and wherein the impeller type flowmeter test included both injecting water into and pumping water from wells at rates ranging from 7.5 to about 26 liters per minute, it was determined that the shift in the calibrations would indicate a difference of about 0.9 liters per minute, a considerable and significant variation particularly at the lower rate of pumping, i.e., about 7 liters per minute. Thus, after only about 5 days, a commercially available impeller type flowmeter drifted by almost 13%. In another set of calibration tests for an impeller flowmeter wherein the first stages thereof consisted of 10 days of constant 15 liters per minute upward flow and the second stage consisted of 7 intermittent (days only) of the same flow rate compared with a third stage which consisted of 5 days at the same flow rate in a downward direction it was determined that with this particular type of device, injection of water down a borehole appears to cause significantly greater shift in calibration than in removal of water from the well with the attendant flow therethrough in an upward direction.

These and other tests lead to the conclusion that with an impeller type flowmeter the calibration curve for such equipment is very sensitive to the condition of the bearing needles and that such equipment requires very frequent maintenance and calibration in order to ensure proper interpretation of field data and that such maintenance must include accommodations for bearing wear. Most importantly, analysis of this calibration data indicate that meters of this type although responsive to flow rates near 1 liter per minute do not in any way accurately ensure, i.e., at precisions of 10% or better, flow rates below about 5 liters per minute.

EXAMPLE II

Subsequent to the 5-day tests referenced in Example I above relating to bioreclamation projects, which 5-day tests incidentally were performed at 5 separate test wells. An early prototype of the instant invention comprising an electromagnet flowmeter was tested at the same site but this time used in 20 wells instead of 5. Over about a 5-month period, this prototype flowmeter was carefully checked and the data therefrom indicated that the flowmeter under test produced very consistent results in flow rates as low as about 0.1 liters per minute at precisions of 10% or better. Accordingly, the tests in this second example, when used to compare the characteristics of the flowmeter of the electromagnet type as compared to one of the impeller type allows for accurate measurements of flow rate at least an order of magnitude lower require considerably less calibration, appear to be equally responsive and calibration drift resistant to both upward and downward flow and are considerably more durable and require much less maintenance.

EXAMPLE III

In consideration of geological formations wherein significant flow rates of groundwater transport in the generally horizontal direction are intersected by a test well thereby resulting in regions of transition from horizontal flow to vertical flow, the resulting turbulence and nonuniform flow would be expected to effect a response of flowmeter testing in such regions. Accordingly, in the tests comprising this example, using the calibration equipment setup described in Example I, but wherein the flowmeter was vertically disposed with its bottommost portion located just slightly above the position of the middle port, a constant flow of water was injected into the 2-inch PVC pipe by means of a water hose connected to said middle port and the discharge therefrom was connected through the top port hose, with the relatively short distance of about 21 inches between the two ports, i.e., the middle port and the top port predetermined to promote nonuniform flow in the pipe.

Although this test may not have represented how the inflow radially enters a borehole, it did provide insight into whether flowmeters should be strictly calibrated with uniform vertical flow when they are used to measure the radial flow to a well. The data also provides insight as to which flowmeter was better suited to measure flow rates when high inflows are expected over small distances.

Before the test, calibrations were performed on both the electromagnetic flowmeter and an impeller type meter. Calibration data for the electromagnetic flowmeter looked good but the data looked poor for the impeller meter. After sharpening the bottom bearing needle and polishing the upper bearing needle, the calibration data for the impeller meter was greatly improved and looked acceptable.

At the beginning of the test, the top of each flowmeter was placed below the midpoint of the inflow and raised at 1-inch increments after each flow measurement. The distance between the flowmeter and the inflow was measured between the midpoint of the inflow and the bottom of the flowmeter. As the flowmeter was raised past the inflow, the meter obstructed the pathway of the injected water. During this period of obstruction, some of the inflow may have been diverted downward and returned as upward flow on the other side of the pipe. Table 1, below, presents the results of this test.

TABLE I

| Effect of Horizontal Inflow on Flowmeter Response | | | | | |
|---|---|---|---|---|---|
| Electromagnetic Meter (Inflow = 8.32 1/min) | | | Impeller Meter (Inflow = 7.301/min) | | |
| Distance from BOM (cm)* | Distance from TOM (cm)** | Mean Flow (1/min) | Distance from BOM (cm)* | Distance from TOM (cm)** | Mean Flow (1/min) |
| −15.8 | −5.1 | 0.0 | −11.4 | −5.1 | 2.42 |
| −10.7 | −2.5 | 0.26 | −8.9 | −2.5 | 4.57 |
| −8.3 | 0.0 | 0.83 | −6.4 | 0.0 | 4.53 |
| −5.7 | 2.5 | 2.34 | −3.8 | 2.5 | 1.89 |
| −3.2 | 5.1 | 2.49 | −1.3 | 5.1 | 1.89 |
| −0.6 | 7.6 | 3.78 | 1.3 | 7.6 | 13.00 |
| 1.9 | 10.2 | 4.76 | 3.9 | 10.2 | 14.97 |
| 4.4 | 12.7 | 6.08 | 6.4 | 12.7 | 3.02 |
| 7.0 | 15.2 | 7.03 | 8.9 | 15.2 | 7.71 |
| 9.5 | 17.8 | 7.56 | 11.4 | 17.8 | 7.90 |
| 12.1 | 20.3 | 8.05 | 14.0 | 20.3 | 7.52 |
| 14.6 | 22.9 | 8.31 | 16.6 | 22.9 | 7.25 |
| 17.1 | 25.4 | 8.31 | 19.1 | 25.4 | 7.00 |
| 19.7 | 27.9 | 8.31 | 21.5 | 27.9 | 6.80 |
| 22.2 | 30.5 | 8.31 | 24.0 | 30.4 | 6.57 |

*Distance measured from midpoint of inflow and bottom entrance of the flowmeter.
Distance measured from midpoint of inflow and top of the flowmeter.
Note: A negative distance indicates a distance below the inflow source. A positive distance indicates a distance above the inflow source. The estimate error associated with these measurements is ±1 cm.

Table 1, supra, shows that the electromagnetic flowmeter can provide misleading results in the vicinity of high horizontal inflows. These misleading results are believed to result from two sources of error. The first source occurred when the meter partially blocked the inflow and caused some of the inflow to spread vertically downward. This effect is expected to become much less important when the incoming flow is controlled by the pressure head at the top of the well and not from the pressure behind the inflow. The second source of error occurred when the flowmeter had passed the inflow but remained in the turbulence caused by the inflow. The data indicated that turbulence will cause an underestimate of the flow rate. Fortunately, the effects of turbulence decline rapidly with distance from the inflow.

Table 1, supra, also shows that the impeller flowmeter appears to be more likely to provide misleading results in the vicinity of high horizontal flows than the electromagnetic flowmeter. The combined effects of the turbulence and nonuniform flow have an unpredictable effect on the impeller flowmeter response until the flowmeter's bottom is about 15 centimeters above the inflow. In the zone of high turbulence, it appears that the eddies can either increase or decrease the spin of the impeller. The lack of a constant flow rate at a distance of 20 to 30 centimeters from the inflow is believed to be caused by nonuniform flow effects on the impeller.

One of the implications of Table 1 data is that when a relatively large flow is detected from either solution cavities or fractures, the discharge rate should be checked by raising or lowering the flowmeter about 10 centimeters. In addition, the accurate determination of the exact location and size of the solution cavity or fractures may be difficult.

EXAMPLE IV

In the tests conducted for purposes of this example, a principal objective realized therefrom was to evaluate the performance of the instant invention particularly under a wide variety of hydrogeological conditions. Also realized from the conduct of these tests were objectives to make design refinements to thereby further increase the versatility of the instant invention. There were two subsets of tests performed wherein approximately 15 wells were tested in the first subset and approximately 35 wells tested in the second subset. In addition, these tests afforded us an opportunity to locate fractures in the limestone and shale bedrock at the Oak Ridge Reservation (ORR) in Tennessee, which represented a hydrogeological situation drastically different from the previously tested Columbus Groundwater Research Site in Mississippi. It was a direct result of these tests which caused our redesign of both the packer assembly and the evolution of the instant meter having the embodiment directed to the smaller throat for utilization of lower flow rates. As in other tests, the overall objective of the application was to define the distribution and the hydraulic characteristics of the fractures to aid in predicting contaminant transport in the bedrock. The application is discussed in four parts. The first part explains why the flowmeter is uniquely suited for the job. The second part outlines the major steps associated with applying the flowmeter. The third part explains the procedures used to measure the vertical flow at designated elevations. The fourth part presents the flowmeter data collected at one of the boreholes.

The ORR overlies a complex mixture of limestone and shale bedrock that is relatively impermeable and is fractured. Most of the fractures are relatively small and not hydraulically significant with relationship to contaminant transport because they are not connected to other fractures. There exists many different indirect techniques to locate fractures. These techniques include inspection of drill cores, use of geophysical equipment, and measured profiles of water quality profiles. However, although all of these techniques help locate fractures, none help to quantify the hydraulic significance of the fracture.

To determine whether a fracture produces water, measurements of groundwater flow is required. Flowmeters tests provide the environment in which to directly measure the hydraulic response of a fractured zone. Flowmeter tests have not been performed at ORR and other similar sites primarily because no conventional flowmeter has the necessary specifications to measure low flowrates. At most of the ORR boreholes, pumping/injecting rates less than 0.5 gal/min are required because of the relatively impermeable bedrock. The low pumping rates require that the flowmeter have a sensitivity and a detection limit less than 0.01 gal/min, requirements not met by any conventional impeller meter but met by the electromagnetic flowmeter. In addition to its low sensitivity and detection limit, the electromagnetic flowmeter has the advantage over most, if not all, conventional impeller meters in that it easily connects to a packer assembly and is easily cleaned. At the ORR, the boreholes have variable diameters with depth. Inflatable packers are required to prevent groundwater flow around the flowmeter. At the ORR, several boreholes are near sources of radioactive and organic contamination. If a flowmeter contacts contaminations in the borehole, the flowmeter will be need to be impounded or steam cleaned. The durable and simple-shaped structure of the electromagnetic flowmeter makes cleaning simple and inexpensive. Impeller meters, on the other hand, with their delicate structures are not easily cleaned.

The instant electromagnetic flowmeter operates in either a trolling or a stationary mode. Typically, the former is used to reconnoiter high flow zones and the latter is used to quantify the hydraulic properties of specific zones. The stationary mode focuses on selectively placing the flowmeter at a designated elevation, measuring the flowrate, and selectively placing the flowmeter at other designated elevations. The following three-step procedure outlines the major tasks associated with using the electromagnetic flowmeter in a stationary mode at the ORR.

Step 1—Attach the packer assembly to the flowmeter and lower the flowmeter to the bottom of the borehole. Raise the flowmeter to designated elevation by tracking the appropriate markings on the multiconductor cable. Inflate the packer and measure the ambient vertical flow. After the vertical flow has been measured, deflate the packer and raise the flowmeter to the next designated elevation and repeat the procedures until all measurements have been taken. Lower the flowmeter to the bottom of the well.

Step 2—Place a pressure transducer slightly below the water table and begin taking pressure measurements at intervals between 1 to 10 seconds. Inject a constant flowrate (typically less than 0.5 gal/min) into the well. Injection is preferred over discharging because it prevents potential contamination from reaching the ground surface. Continue pumping until the water table stabilizes. At this point, the injected rate equals the flow rate into the aquifer; no change in storage within the borehole is occurring. The higher the injection rate, the longer the time required for the water table to stabilize and the higher the elevation for the stabilized water table. If injection rates are too high, then the water table will not stabilize before the borehole overflows.

Step 3—Raise the flowmeter to designated elevation by tracking the appropriate markings on the multiconductor cable. Inflate the packer and measure the vertical flow. After the vertical flow has been measured, deflate the packer and raise the flowmeter to the next designated elevation and repeat the procedures until all of measurements have been taken. The groundwater flow produced at each interval by injecting water is the difference in the flow measured before and during pumping.

The packer is inflated with water. When the depth to water is less than 30 feet, surface pumps are used to pump water into and out of the packer via a 0.25-inch ID tube that is attached to the multiconductor cable. When the depth to water is greater than 30 feet, a submersible pump is lowered with the flowmeter and used to inflate the packer. Whether surface pumps or submersible pumps are used, the packer is inflated to about 20 psi. When surface pumps are used, the pressure is measured with an in-line pressure gauge at the surface. When submersible pumps are used, the pressure is controlled by a strategically placed pressure release value. All of the packer applications at ORR were with a surface pump.

A flowmeter reading at an elevation is the mean value of a set of values. Typically, the integration constant is set at 1-second intervals. The "1-second" readings are continually recorded by the hardware and updates of the mean and standard deviations are monitored by the flowmeter operator. Once the values for the mean and standard deviation stabilize, flowmeter measurements cease and the flowmeter is moved to a new elevation. One sign of potential problems are high values for standard deviations.

For the purpose of illustration, Table II below lists the flowmeter test measurements at borehole WOL 2 at ORR with the 1-inch ID flowmeter on Aug. 23, 1990, during a injection rate of about 0.4 gal/min. The well is approximately 200 feet deep. The well survey focused on the upper portion of the borehole, which is approximately 200 feet deep. As shown by the recorded time, the measurements occurred from top to bottom. The flowmeter survey shows that between the bottom of the well (about 200 feet) to a depth of 62 feet, less than half the flow enters the borehole whereas between the much smaller interval 62 to 50 feet more than half of the flow enter the borehole. The flowmeter measurements shows that most of the fractures near borehole WOL 2 are near the top of the bedrock.

TABLE II

| Flowmeter Measurements at Borehole WOL 2 | | | |
|---|---|---|---|
| Time | Depth (ft) | Average Volts | Standard Deviation | Average Flow (gal/min) |
| 09:19:43 | 50 | −0.210 | 0.014 | −0.380 |
| 09:25:30 | 62 | −0.090 | 0.010 | −0.140 |
| 09:35:32 | 66 | −0.087 | 0.015 | −0.134 |
| 09:45:51 | 70 | −0.088 | 0.006 | −0.136 |
| 09:55:08 | 74 | −0.081 | 0.006 | −0.122 |
| 10:02:43 | 78 | −0.081 | 0.006 | −0.110 |
| 10:08:26 | 90 | −0.075 | 0.005 | −0.110 |
| 10:17:56 | 110 | −0.074 | 0.004 | −0.108 |
| 10:22:08 | 130 | −0.061 | 0.007 | −0.082 |

After sifting and winnowing through the data, supra, as well as other results and operations of the instant new, novel, and improved technique, including methods and means for the effecting thereof, the operating variables, including the acceptable and preferred conditions for carrying out this invention are summarized below.

nal, and wherein juxtaposed such remotely located situs is located transducer means for activation by such events, and connector means for effecting communication between such situses, said improved method comprising the steps of:

(a) positioning said transducer means at the event situs and effecting, with said connector means, communication between said transducer means and said signal generating and receiving means;

(b) coupling said signal generating and receiving means to a first power supply means for providing thereto positive and negative voltage amplitudes;

(c) coupling said signal generating and receiving means to a second power supply means for generating an AC square wave excitation signal and transmitting same to said transducer means, said excitation signal synchronized with at least one timing signal provided by said signal generating and receiving means and said first and said second power supply means electrically insulated one from the other;

(d) receiving from said transducer means a metering signal indicative of event occurrences at said remotely located situs;

(e) dividing down output of said signal generating and receiving means to provide timing signals synchronized with said excitation signal and with said metering signal, said signal generating and receiving means having a master clock period of a frequency ranging from 4 to 15 times that of said square wave excitation signal;

(f) selecting, in whole multiples of said master clock period, a sample of said metering signal, said sample selection continuing for at least one such clock period and for less than one-half of the number of

| Variables | Operating Limits | Preferred Limit: | Most Preferred Limits |
|---|---|---|---|
| Counter Outputs in Multiples of Two | 4–20 | 6–12 | 8–10 |
| Frequency of Master Clock in Hz/Period of $T_1$ in Ms | — | 30–120/33–8 | 60/16.7 |
| Ratio of Master Clock Frequency to Frequency of Square Wave Excitation Signal | — | 4:1–15:1 | 10:1 |
| Ratio $T_1:T_2$ | About $1.6 \times 10^5:1$ to about 0.3:1 | About 16:1 to about 1:1 | About 5:1 |
| Period of $T_3$ | Determined empirically- must be at least $T_2$ plus an increment sufficiently long to clamp switching transients | — | — |
| System Resolution as Feet per Second of Fluid Flow | — | Down to about 0.01 | Down to about 0.001 |
| Length of Multicable Connector Between Probe and Signal Conditioning Electronics in Feet | 10–10,000 | 10–5,000 | 10–1,000 |
| Effective Magnetic Coupling with Fluid Flowing through Probe Expressed as Microvolt Potential across Electrodes | — | — | 6–8 μv/fps of flow |
| Total System Gain from Electrodes to Digital Panel Meter | 50,000–700,000 | 200,000–400,000 | 220,000% 10% |

What we claim as new and desire to secure by Letters Patent of the United States is:

1. An improved method for monitoring events occurring at a situs remotely located from an observation situs, wherein juxtaposed such observation situs is signal generating and receiving means for at least both generating an excitation signal and receiving a metering sigsuch clock periods which comprise the frequency of said excitation signal, and thereafter alternately switching the polarity of said AC square wave excitation signal, whereby transients effected in said metering signal by each such switching are generated after sampling of signal from each positive and each negative amplitude of said metering signal is complete; and (g) deselecting that portion of the metering signal containing switching transients generated by said AC square wave excitation in step (f) supra, said deselecting initiated at the end of each sampling period and continued for a time sufficient to bridge the transition in polarity change of said AC square wave excitation signal whereby the resulting clamped switching transients are prevented from effecting feedback of noise to said sample of said metering signal.

2. The improved method of claim 1, wherein said signal generating and receiving means includes counter means for said dividing down of output therefrom, gate means responsive to two outputs of said counter means to effect control of later mentioned timing means, and timing means for deselecting said portion of said metering containing said switching transients.

3. The improved method of claim 2, including coupling to said timing means, an analog switching means for deselecting a portion of said metering signal.

4. The improved method of claim 3 wherein synchronous network sampling means is coupled to the output of said analog switching means and synchronized with said phase shifted AC square wave excitation signal to effect signal from said analog switching means for those whole multiples of said master clock period during which said sample selection continues.

5. The improved method of claim 4, wherein said events comprise the flow of fluid within an enclosed conduit and axially through said flow channel of said transducer means.

6. The improved method of claim 5, wherein travel within said conduit by said transducer means is effected by said connector means, wherein said AC square wave excitation signal effects a magnetic field in said transducer means, and wherein said metering signal is effected by electrodes in said transducer means, said electrodes being determinative of voltage induced by said magnetic field in said flowing fluid.

7. The improved method of claim 6, wherein collar means for substantially preventing by-passing of fluid flowing in said conduit around said flow channel means is fitted about said transducer means.

8. The improved method of claim 7, wherein fluid under pressure is introduced into the interface between a first rigid tube sealed about said transducer means and a second resilient tube sealed about said first tube to effect movement of said resilient material in a direction away from said first tube and into stop means engagement with the inner diameter of said conduit to prevent by-passing of fluid flowing in said conduit around said flow channel means.

* * * * *